US008982593B2

(12) United States Patent
Nondahl et al.

(10) Patent No.: US 8,982,593 B2
(45) Date of Patent: *Mar. 17, 2015

(54) CASCADED H-BRIDGE (CHB) INVERTER LEVEL SHIFT PWM WITH ROTATION

(71) Applicant: Rockwell Automation Technologies, Inc., Mayfield Heights, OH (US)

(72) Inventors: Thomas Nondahl, Greenfield, WI (US); Jingbo Liu, Grafton, WI (US); Zhongyuan Cheng, Cambridge (CA); Navid Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,295

(22) Filed: Oct. 7, 2013

(65) Prior Publication Data
US 2014/0036557 A1 Feb. 6, 2014

Related U.S. Application Data

(63) Continuation-in-part of application No. 13/458,104, filed on Apr. 27, 2012, now Pat. No. 8,619,446.

(51) Int. Cl.
H02M 7/49 (2007.01)
H02M 7/5387 (2007.01)
H02M 1/12 (2006.01)
H02M 7/5395 (2006.01)
H02M 7/483 (2007.01)

(52) U.S. Cl.
CPC ............ H02M 7/53871 (2013.01); H02M 1/12 (2013.01); H02M 7/5395 (2013.01); H02M 7/49 (2013.01); H02M 2007/4835 (2013.01)
USPC ................................... 363/98; 363/36; 363/71

(58) Field of Classification Search
USPC ................ 363/34, 36, 37, 65, 71, 95, 98, 132
See application file for complete search history.

(56) References Cited

U.S. PATENT DOCUMENTS

| 4,443,841 A | 4/1984 | Mikami et al. |
| 4,894,621 A | 1/1990 | Koenig et al. |
| 5,298,848 A | 3/1994 | Ueda et al. |
| 5,361,196 A | 11/1994 | Tanamachi et al. |
| 5,502,633 A | 3/1996 | Miyazaki et al. |

(Continued)

FOREIGN PATENT DOCUMENTS

| CN | 1190278 | 8/1998 |
| CN | 1253999 | 5/2000 |

(Continued)

OTHER PUBLICATIONS

Barbosa, Peter et al., *Active Neutral-Point-Clamped Multilevel Converters*, IEEE, 0-7803-9033-4, 2005, pp. 2296-2301.

(Continued)

*Primary Examiner* — Gary L Laxton
(74) *Attorney, Agent, or Firm* — Fay Sharpe LLP

(57) ABSTRACT

Cascade H-Bridge inverters and carrier-based level shift pulse width modulation techniques are presented for generating inverter stage switching control signals, in which carrier waveform levels are selectively shifted to control THD and to mitigate power distribution imbalances within multilevel inverter elements using either complementary carrier or complementary reference modulation techniques.

20 Claims, 31 Drawing Sheets

(56) References Cited

U.S. PATENT DOCUMENTS

| | | | |
|---|---|---|---|
| 5,625,545 | A | 4/1997 | Hammond |
| 5,638,263 | A | 6/1997 | Opal et al. |
| 5,642,275 | A | 6/1997 | Peng et al. |
| 5,790,396 | A | 8/1998 | Miyazaki et al. |
| 5,933,339 | A | 8/1999 | Duba et al. |
| 5,986,909 | A | 11/1999 | Hammond et al. |
| 6,005,788 | A | 12/1999 | Lipo et al. |
| 6,031,738 | A | 2/2000 | Lipo et al. |
| 6,058,031 | A | 5/2000 | Lyons et al. |
| 6,075,350 | A | 6/2000 | Peng |
| 6,222,284 | B1 | 4/2001 | Hammond et al. |
| 6,229,722 | B1 | 5/2001 | Ichikawa et al. |
| 6,236,580 | B1 | 5/2001 | Aiello et al. |
| 6,320,767 | B1 | 11/2001 | Shimoura et al. |
| 6,411,530 | B2 | 6/2002 | Hammond et al. |
| 6,556,461 | B1 | 4/2003 | Khersonsky et al. |
| 6,697,271 | B2 | 2/2004 | Corzine |
| 7,106,025 | B1 | 9/2006 | Yin et al. |
| 7,164,254 | B2 | 1/2007 | Kerkman et al. |
| 7,215,559 | B2 | 5/2007 | Nondahl et al. |
| 7,830,681 | B2 * | 11/2010 | Abolhassani et al. .......... 363/37 |
| 8,107,267 | B2 | 1/2012 | Tallam et al. |
| 8,619,446 | B2 * | 12/2013 | Liu et al. .......... 363/71 |
| 2008/0079314 | A1 | 4/2008 | Hammond |
| 2009/0073622 | A1 | 3/2009 | Hammond |
| 2010/0301975 | A1 | 12/2010 | Hammond |
| 2011/0249479 | A1 | 10/2011 | Capitaneanu et al. |
| 2012/0057380 | A1 | 3/2012 | Abe |
| 2012/0113698 | A1 | 5/2012 | Inoue |

FOREIGN PATENT DOCUMENTS

| | | |
|---|---|---|
| CN | 1414692 | 4/2003 |
| CN | 2577503 | 10/2003 |
| CN | 2737060 | 10/2005 |
| CN | 1925289 | 3/2007 |
| EP | 0 874 448 | 10/1998 |
| EP | 1713168 A3 | 10/2006 |
| WO | WO2012105737 A1 | 8/2012 |

OTHER PUBLICATIONS

Bruckner, Thomas, et al., *The Active NPC Converter and Its Loss-Balancing Control,* IEEE Transactions on Industrial Electronics, vol. 52, No. 3, Jun. 2005, pp. 855-868.

Cengelci, E., et al., *A New Medium Voltage PWM Inverter Topology for Adjustable Speed Drives,* IEEE, 0-7803-4943-1, 1998, pp. 1416-1423.

Chaudhuri, Toufann, et al., *Introducing the Common Cross Connected Stage ($C^3S$) for the 5L ANPC Multilevel Inverter,* IEEE, 978-1-4244-1668-4, 2008, pp. 167-173.

Cheng, Zhongyuan et al., *A Novel Switching Sequence Design for Five-Level NPC/H-Bridge Inverters with Improved Output Voltage Spectrum and Minimized Device Switching Frequency,* Power Electronics, IEEE Transactions, vol. 22, Issue 6, 2007, 6 pgs.

Etxeberria-Otadui, I., et al., *Analysis of a H-NPC topology for an AC Traction Front-End Converter,* IEEE, 978-1-4244-1742-1, 2008 13th International Power Electronics and Motion Control Conference, pp. 1555-1561.

Floricau, Dan et al., *A new stacked NPC converter: 3L-topology and control,* Proceedings of the 12th European Conf. on Power Electronics and Applications, EPE 2007, EPE Association, 2007, 10 pgs.

"Multilevel CHB Inverters", obtained from the internet at http://www4.hcmut.edu.vn/~nvnho/Download/AdPE/, Jan. 18, 2009.

Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.

Angulo, Mauricio, et al., "Level-shifted PMW for Cascaded Multilevel Inverters with Even Power Distribution", IEEE Power Electronics Specialists Conference (PESC), pp. 2373-2378, Jun. 2007.

Asi Robicon, "Perfect Harmony MV Drive Product Overview", 18 pgs.. obtained from the World Wide Web Apr. 2013.

Glinka, M., *Prototype of Multiphase Modular-Multilevel-Converter with 2 MW power rating and 17-level-output-voltage,* IEEE, 0-7803-8399-0, 2004, pp. 2572-2576.

Guennegues, V., et al., *A Converter Topology for High Speed Motor Drive Applications,* IEEE Xplore, 2009, 8 pgs.

Guennegues, V., et al., *Selective Harmonic Elimination PWM applied to H-bridge topology in high speed applications,* POWERENG, Mar. 2009, pp. 152-156.

Hiller, Mark et al., *Medium-Voltage Drives; An overview of the common converter topologies and power semiconductor devices,* IEEE Industry Applications Magazine, Mar.-Apr. 2010, pp. 22-30.

Hossein Iman-Eini et al., "A Fault-Tolerant Control Strategy for Cascaded H-Bridge Multilevel Rectifiers", Journal of Power Electronics, vol. 1, Jan. 2010.

Hossein Sepahvand et al., "Fault Recovery Strategy for Hybrid Cascaded H-Bridge Multi-Level Inverters", 2011 IEEE, pp. 1629-1633.

Jose Rodriquez et al., "Operation of a Medium-Voltage Drive Under Faulty Conditions", IEEE Transactions on Industrial Electronics, vol. 52, No. 4, Aug. 2005, pp. 1080-1085.

Kieferndorf, F., et al., *A New Medium Voltage Drive System Based on ANCP-5L Technology,* IEEE, 978-1-4244-5697-0, 2010, pp. 643-649.

Kouro, Samir, et al., *Recent Advances and Industrial Applications of Multilevel Converters,* IEEE Transactions on Industrial Electronics, vol. 57, No. 8, Aug. 2010, pp. 2553-2580.

Lesnicar, A., et al., *A new modular voltage source inverter topology,* Inst. of Power Electronics and Control, Muenchen, DE, Oct. 10, 2007, pp. 1-10.

Li, Jun, et al., *A New Nine-Level Active NPC (ANPC) Converter for Grid Connection of Large Wind Turboines for Distributed Generation,* IEEE Transactions on Power Electronics, vol. 26, No. 3, Mar. 2011, pp. 961-972.

McGrath, Brendan Peter et al., "Multicarrier PMW Strategies for Multilevel Inverters," IEEE transactions on Industrial Electronics, vol. 49, No. 4, pp. 858-867, Aug. 2002.

Meili, Jorg et al., *Optimized Pulse Patterns for the 5-Level ANPC Converter for High Speed High Power Applications,* IEEE, 1-4244-0136-4, 2006, pp. 2587-2592.

O-Harvest, product information, Beijing Leader & Harvest Electric Technologies Co., Ltd., http:/www.ld-harvest.com/en/3-1-2.htm, retrieved from the Internet Apr. 11, 2013, 3 pgs.

Pablo Lezana et al., "Survey on Fault Operation on Multilevel Inverters", IEEE Transactions on Industrial Electronics, vol. 57, No. 7, Jul. 2010, pp. 2207-2217.

Park, Young-Min, "A Simple and Reliable PWM Synchronization & Phase-Shift Method for Cascaded H-Bridge Multilevel Inverters based on a Standard Serial Communication Protocol", IEEE 41st IAS Annual Meeting, pp. 988-994, Oct. 2006.

Robicon Perfect Harmony, "Medium-Voltage Liquid-Cooled Drives", Siemens, Catalog D 15.1, 2012, USA Edition, obtained from the World Wide Web Apr. 2013, 91 pgs. (Downloaded to EFS Web as Part 1, pp. 1-49; and Part 2, pp. 50-91).

Robicon Perfect Harmony, "The Drive of Choice for Highest Demands", Siemens, Copyright Siemens AG 2008, 16 pgs, .obtained from the World Wide Web Apr. 2013.

Saeedifard, Maryann et al., *Analysis and Control of DC-Capacitor-Voltage-Drift Phenomenon of a Passive Front-End Five-Level Converter,* IEEE Transactions on Industrial Electronics, vol. 54, No. 6, Dec. 2007, pp. 3255-3266.

Sanmin Wei et al., "Control Method for Cascaded H-Bridge Multilevel Inverter with Faulty Power Cells", 2003 IEEE, pp. 261-267.

Sedghi, S. et al., "A New Multilevel Carrier Based Pulse Width Modulation Method for Modular Multilevel Inverter", IEEE 8th International Conference on Power Electronics and ECCE Asia (ICPE & ECCE), pp. 1432-1439, May 30 to Jun. 3, 2011.

Serpa, L.A. et al., *Five-Level Virtual-Flux Direct Power Control for the Active Neutral-Point Clamped Multilevel Inverter,* IEEE, 978-1-4244-1668-4, 2008, pp. 1668-1674.

Silva, Cesar et al., *Control of an Hybrid Multilevel Inverter for Current Waveform Improvement,* IEEE, 978-1-4244-1666-0, 2008, pp. 2329-2335.

(56) References Cited

OTHER PUBLICATIONS

Surin Khomfoi et al., "Fault Detection and Reconfiguration Technique for Cascaded H-bridge 11-level Inverter Drives Operating under Faulty Condition", 2007 IEEE, PEDS 2007, pp. 1035-1042.
Ulrich, James A., et al., *Floating Capacitor Voltage Regulation in Diode Clamped Hybrid Multilevel Converters*, IEEE, 978-1-4244-3439-8, 2009, pp. 197-202.
Wen, Jun et al., *Synthesis of Multilevel Converters Based on Single- and/or Three-Phase Converter Building Blocks*, IEEE Transactions on Power Electronics, vol. 23, No. 3, May 2008, pp. 1247-1256.
Wenchao Song et al., "Control Strategy for Fault-Tolerant Cascaded Multilevel Converter based STATCOM", 2007 IEEE, pp. 1073-1076.
Wu, Bin, "High-Power Converters and AC Drives", Chapter 7, pp. 119-142, Wiley-IEEE Press, 2006.
Wu, C.M., et al., *A Five-Level Neutral-Point-Clamped H-Bridge PWM Inverter with Superior Harmonics Suppression: A Theoretical Analysis*, IEEE, 0-7803-5471-0, 1999 V-198-V-201.
Yantra Harvest Energy Pvt. Ltd., "Medium Voltage Drives", www.yantraharvest.com, obtained from the World Wide Web Apr. 2013.
Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.
WU, High-Power Converters and AC Drives. New York/Piscataway, NJ: Wiley/IEEE Press, 2006, Ch. 1.
Rendusara, et al., "Analysis of common mode voltage-'neutral shift' in medium voltage PWM adjustable speed drive (MV-ASD) systems", IEEE Trans. Power Electron., vol. 15, No. 6, pp. 1124-1133, Nov. 2000.
Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.
Naik et al., "Circuit model for shaft voltage prediction in induction motors fed by PWMbased AC drives", IEEE Trans. Ind. Appl., vol. 39, No. 5, pp. 1294-1299, Nov./Dec. 1996.
Akagi et al., "A Passive EMI Filter for Eliminating Both Bearing Current and Ground Leakage Current From an Inverter-Driven Motor", IEEE Transactions on Power Electronics, 2006, pp. 1459-1469.
Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012, pp. 1152-1158.
Akagi et al., "An Approach to Eliminating High-Frequency Shaft Voltage and Ground Leakage Current From an Inverter-Driven Motor", IEEE Transactions on Industry Applications, 2004, pp. 1162-1169.
Zhu et al., An Integrated AC Choke Design for Common-Mode Current Suppression in Neutral-Connected Power Converter Systems. IEEE Transactions on Power Electronics, 2012, pp. 1228-1236.
Cavalcanti et al., "Modulation Techniques to Eliminate Leakage Currents in Transformerless Three-Phase Photovoltaic Systems", IEEE Transactions on Industrial Electronics, 2010, pp. 1360-1368.
Horvath, "How isolation transformers in MV drives protect motor insulation", TM GE Automation Systems, Roanoke, VA, 2004.
Lai et al., "Optimal common-mode voltage reduction PWM technique for inverter control with consideration of the dead-time effects-part I: basic development," IEEE Trans. Ind. Appl., vol. 40, No. 6, pp. 1605-1612, Nov./Dec. 2004.
Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.
Hava et al., "A high-performance PWM algorithm for common-mode voltage reduction in three-phase voltage source inverters," IEEE Trans. Power Electron., vol. 26, No. 7, pp. 1998-2008, Jul. 2011.
Cacciato et al., "Reduction of common mode currents in PWM inverter motor drives", IEEE Trans. Ind. Appl., vol. 35, No. 2, pp. 469-476, Mar./Apr. 1999.
Cacciato et al., "Modified space-vector-modulation technique for common mode currents reduction and full utilization of the DC bus", in Proc. IEEE APEC Conf. Rec., 2009, pp. 109-115.
Kouro et al., "Recent advances and industrial applications of multilevel converters," IEEE Trans. Ind. Electron., vol. 57, No. 8, pp. 2553-2580, Aug. 2010.
Wu, "High-Power Converters and AC Drives", Piscataway, NJ: IEEE Press, 2006, Chapter 9.
Rodriguez et al., "Multilevel inverters: A survey of topologies, controls, and applications," IEEE Trans. Ind. Electron., vol. 49, No. 4, pp. 724-738, Aug. 2002.
Rodriguez, et al., "Multilevel voltage source-converter topologies for industrial medium-voltage drives," IEEE Trans. Ind. Electron., vol. 54, No. 6, pp. 2930-2945, Dec. 2007.
Saeedifard, et al., "Operation and control of a hybrid seven-level converter," IEEE Trans. Power Electron., vol. 27, No. 2, pp. 652-660, Feb. 2012.
Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.
Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.
Guennegues et al., "Selective harmonic elimination PWM applied to H-bridge topology in high speed applications," in Proc. Int. Conf. POWERENG, Mar. 18-20, 2009, pp. 152-156.
Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.
Bruckner et al., "The active NPC converter and its loss-balancing control," IEEE Trans. Ind. Electron., vol. 52, No. 3, pp. 855-868, Jun. 2005.
Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.
Meili et al., "Optimized pulse patterns for the 5-level ANPC converter for high speed high power applications," in Proc. 32nd IEEE IECON, Nov. 6-10, 2006, pp. 2587-2592.
Serpa et al., "Fivelevel virtual-flux direct power control for the active neutral-point clamped multilevel inverter," in Proc. IEEE Power Electron. Spec. Conf., 2008.
Kieferndorf et al., "A new medium voltage drive system based on anpc-5l technology," in Proc. IEEE-ICIT, Viña del Mar, Chile, Mar. 2010, pp. 605-611.
Barbosa et al., "Active neutral-point-clamped multilevel converters," in Proc. IEEE 36th Power Electron. Spec. Conf., Jun. 16, 2005, pp. 2296-2301.
Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.
Rodriguez et al., "A New Modulation Method to Reduce Common-Mode Voltages in Multilevel Inverters", IEEE Transactions on Industrial Electronics, vol. 51, No. 4, Aug. 2004, 834-939.
Lesnicar et al., "An Innovative Modular Multilevel Converter Topology Suitable for a Wide Power Range", 2003 IEEE Bologna PowerTech Conference, Jun. 23-26, Bologna Italy, 6 pgs.
Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.

\* cited by examiner

US 8,982,593 B2

CASCADED H-BRIDGE (CHB) INVERTER LEVEL SHIFT PWM WITH ROTATION

REFERENCE TO RELATED APPLICATION

This application is a continuation-in-part of, and claims priority to and the benefit of, U.S. patent application Ser. No. 13/458,104, filed on Apr. 27, 2012, entitled CASCADED H-BRIDGE (CHB) INVERTER LEVEL SHIFT PWM WITH ROTATION, the entirety of which application is hereby incorporated by reference.

BACKGROUND

Motor drives and other power conversion systems typically receive AC input power and convert that to an internal DC for subsequent conversion to AC output power for driving a motor or other load. Multilevel inverters are sometimes used in motor drives to generate and provide high voltage drive signals to the motor in high power applications. One form of multilevel inverter is a Cascaded H-Bridge (CHB) inverter architecture, which employs multiple series-connected H-Bridge inverters for driving each motor winding phase. Each H-Bridge is powered by a separate DC source and is driven by switch signals to generate positive or negative output voltage, with the series combination of multiple H-Bridge stages providing multilevel inverter output capability for driving a load. Various modulation techniques can be used for generating the CHB switching signals, such as phase shift pulse width modulation (PS PWM) and level shift pulse width modulation (LS PWM). In any power conversion system, reducing Total Harmonic Distortion (THD) is an important design goal. Accordingly, level shift PWM is commonly used for generating the CHB switching signals in multilevel voltage source medium voltage inverters for motor drive applications, as this provides better output line-line voltage THD than phase shifted PWM, and does not generate certain additional dv/dt problems associated with PS PWM. However, LS PWM has certain shortcomings for high power converters due to uneven power distribution, and this technique can lead to increased input current harmonics. In particular, individual input rectifiers are loaded unevenly, especially at lower output modulation indices, where device switching frequency is not equal to carrier frequency and is not the same for all switches. Accordingly, a need remains for improved carrier-based pulse width modulation techniques and multilevel inverters for driving motors and other loads.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

CHB inverters and carrier-based level shift pulse width modulation techniques are presented for generating inverter stage switching control signals, in which carrier waveform levels are selectively shifted to control THD and to mitigate power distribution imbalances within multilevel inverter elements using either complementary carrier or complementary reference modulation techniques via easy to implement carrier rotation to facilitate even power distribution and good balance among series-connected power cells, along with favorable output voltage and current total harmonic distortion (THD) and good input current THD, even for low modulation index operation. The various concepts of the present disclosure can be advantageously employed in single or multiphase multilevel inverters for motor drives or other forms of power conversion systems. Level shift PWM switching approaches are disclosed for controlling CHB or other multilevel inverters having series connected inverter stages, which can be employed in association with i-level inverters, where "i" is more than seven, in which carrier levels are selectively adjusted or shifted according to a repeating level shifting pattern.

Exemplary level shift patterns are set forth including saw tooth carrier patterns as well as triangular patterns. The level shifting for the pulse width modulation carriers can be done using any carrier waveform shape and carrier frequency (period), with various implementations being possible in which any integer number of level increments can be used for shifting, and the shifting can be done every carrier period or every integer number carrier periods, with or without dwelling.

In accordance with one or more aspects of the present disclosure, power conversion systems are provided which include a multilevel inverter and a controller. In certain implementations, a single phase power source is provided, but multiphase power source embodiments are possible in which a multilevel inverter is provided for each output phase. The multilevel inverter includes an integer number N inverter stages, where N is greater than three, with each stage having switching devices operative according to corresponding control signals to generate a stage output voltage of one of at least two discrete levels, and with the outputs of multiple stages being cascaded in a series connected fashion. In certain embodiments, the inverter stages are H-Bridge circuits with four switches coupled between a corresponding DC source and the stage output. The controller generates N carrier waveforms, such as using analog circuitry to generate voltage waveform signals or a digital processor creating numeric waveform values, with each carrier waveform at a different one of a plurality of non-overlapping amplitude levels within an expected range of a pair of complementary reference signals or values. The carrier waveform set, moreover, includes a single carrier waveform for each of the inverter stages, with the carrier waveforms having substantially equal periods. In addition, the controller shifts the amplitude level of at least two of the carrier waveform signals or values every integer number M waveform periods according to a repeating level shifting pattern, where M is greater than zero.

Various embodiments are possible in which any suitable type or shape of waveform can be used, such as a periodic triangular carrier, for instance. Moreover, any number of two or more of the carrier waveforms may be selectively shifted, and in certain embodiments, all the carriers are shifted every M cycles by the controller according to the level shifting pattern, with optional dwelling at certain levels. In certain embodiments, M is greater than one, and the levels are not shifted every carrier period. In certain embodiments, moreover, the individual carrier waveforms may be shifted by at least two amplitude levels every M waveform periods according to the pattern.

Multilevel inverter switching control signal generation methods are provided, as well as non-transitory computer readable mediums with computer executable instructions for carrying out such methods, in accordance with further aspects of the disclosure. The methods include generating a set of N carrier waveforms, which can be in the form of signals or values in various embodiments, with the waveform set including a single carrier for each stage of the multilevel inverter, and with each carrier waveform being at a different amplitude level. These methods further involve providing switching control signals to the multilevel inverter based on comparison of carrier waveforms for a given inverter stage with a pair of complementary reference signals or values. The amplitude levels of at least two of the carrier waveforms are shifted every integer number M waveform periods according to a repeating level shifting pattern (with or without optional dwelling) in certain embodiments. In various implementations, M can be greater than one, and all the carriers may be shifted every M carrier cycles in certain embodiments. The shifting, moreover, may be by two or more amplitude levels in certain embodiments.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
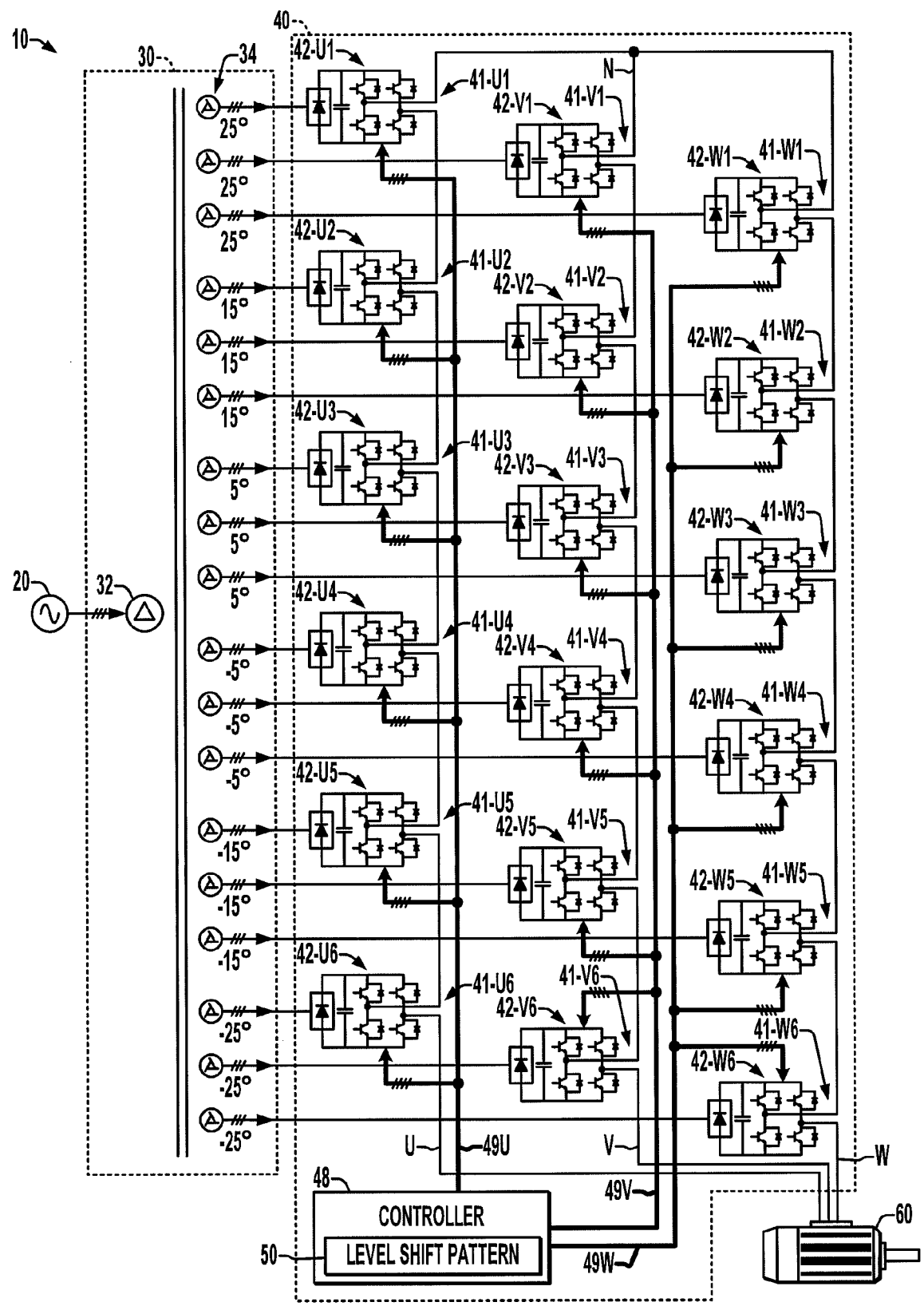
FIG. 1 is a schematic diagram illustrating an exemplary three-phase 13-level CHB inverter-based motor drive with a controller providing switching control signals to the CHB inverter stages according to a level shift pattern in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale.

FIG. 1 illustrates an exemplary 13-level CHB power conversion system 10 with a plurality of series-connected inverter stages 42 for each of three phases. FIGS. 2-13F illustrate exemplary level shift PWM techniques employed in the system 10 using a pair of complementary carriers 43, 45 and a single reference 47 for sine-triangle type modulation for each inverter stage 42, and FIGS. 14-25F illustrate level shift PWM techniques using complementary reference type pulse width modulation techniques in the system 10.

Figure 2:
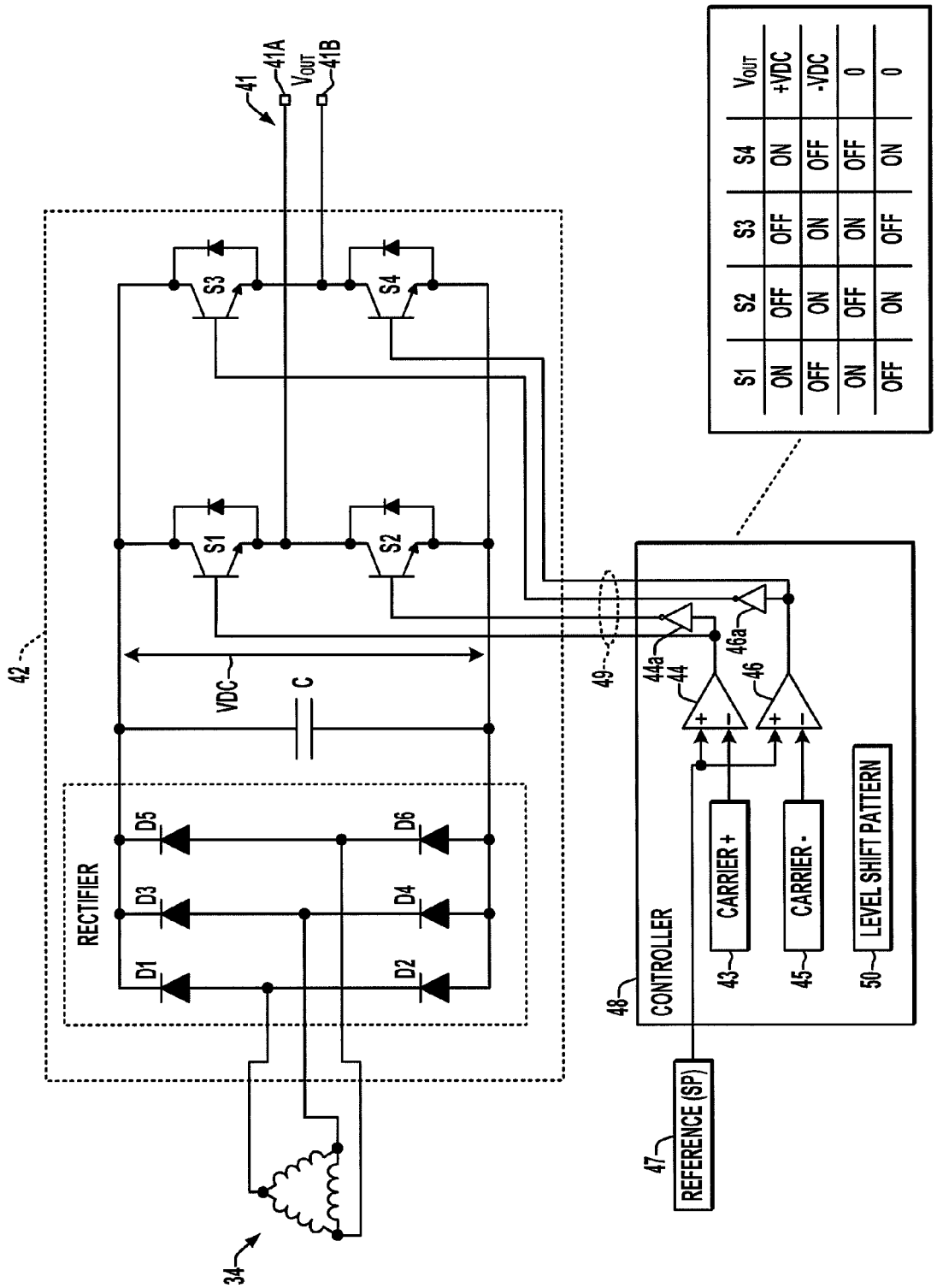
FIG. 2 is a schematic diagram illustrating further details of an exemplary H-Bridge inverter stage in the power converter of FIG. 1 with a three-phase rectifier coupled to a transformer secondary, along with a level shift pattern and comparison circuitry or logic in the controller for generating inverter control signals by comparing first and second carrier waveform signals or values with a reference signal or value.
Figure 3:
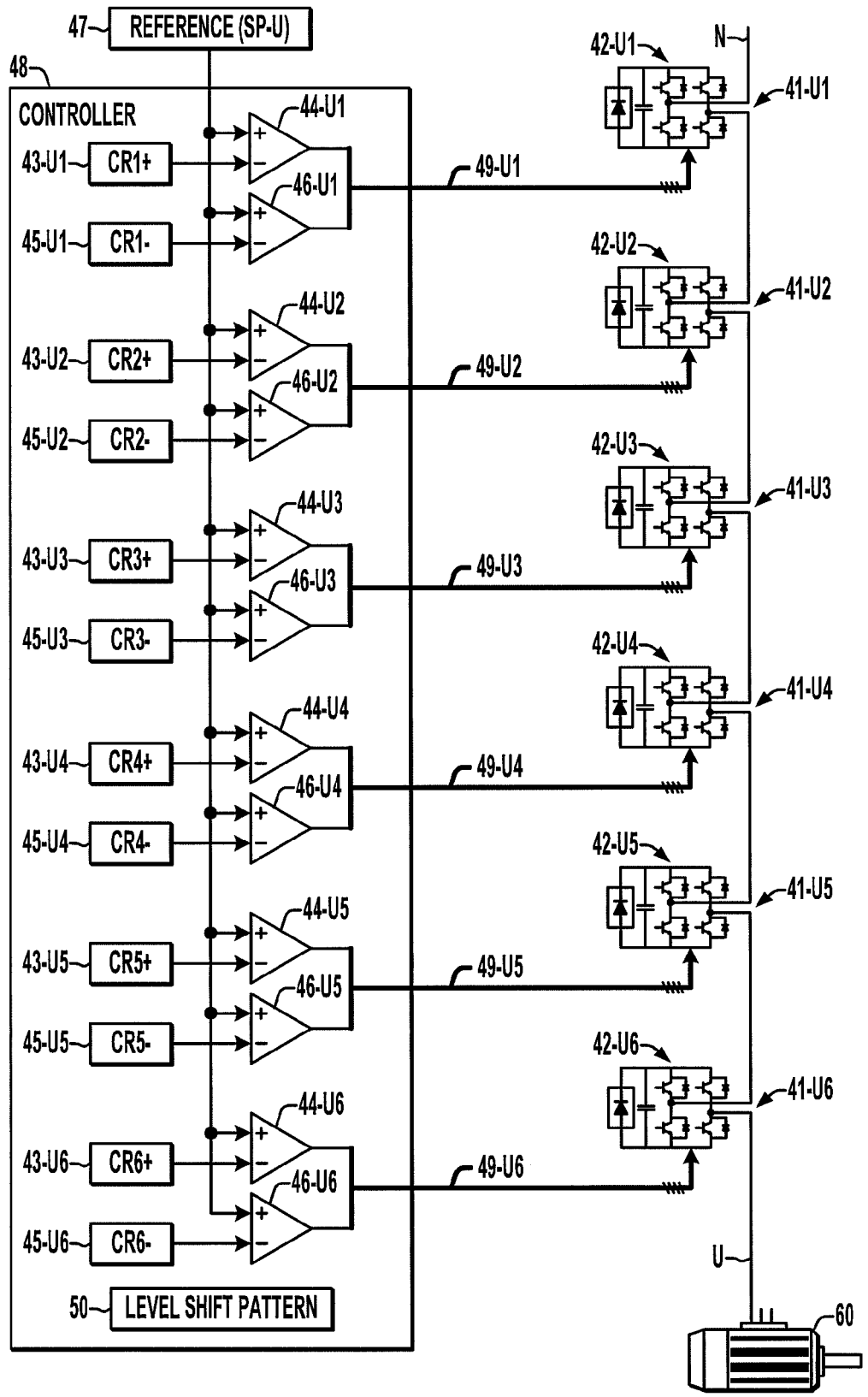
FIG. 3 is a schematic diagram illustrating carrier waveform comparison circuitry or logic for six cascaded H-Bridge inverter stages to drive one of the phases of a three-phase motor in the power converter of FIG. 1.

Referring initially to FIGS. 1-3, an exemplary 13-level CHB inverter-based motor drive power conversion system 10 is illustrated, including a three-phase multilevel inverter 40 and a controller 48 that provides switching control signals 49 to individual CHB inverter stages 42 based on a level shift pattern 50 in accordance with one or more aspects of the present disclosure. Although illustrated in the context of a multiphase 13-level inverter 40 with six inverter stages 42 for each of three motor load phases U, V and W, the various aspects of the present disclosure may be implemented in association with single phase or multiphase, multilevel inverters having any integer number "N" inverter stages 42, where N is greater than three (e.g., 9-level or higher level inverters). In addition, although the illustrated embodiments utilize H-Bridge stages 42 cascaded to form multilevel inverters 40 for each phase of the motor drive system 10, other types and forms of inverter stages 42 can be used, such as a stage with a switching circuit having more or less than four switching devices, wherein the broader aspects of the present disclosure are not limited in scope by the illustrated embodiments.

As best seen in FIG. 1, the motor drive power conversion system 10 includes a phase shift transformer 30 having a multiphase primary 32 (a delta configuration in the illustrated embodiment) receiving three-phase power from an AC power source 20. The transformer 30 includes 18 three-phase secondaries 34, comprised of six sets of three delta-configured three-phase secondaries 34, with each set being at a different phase relationship. Although the primary 32 and the secondaries 34 are configured as delta windings in the illustrated example, "Y" connected primary windings and/or secondary windings can alternatively be used. In addition, while the transformer has three-phase primary and secondary windings 32, 34, other single or multiphase implementations can be used. Each of the three-phase secondaries 34 is coupled to provide AC power to drive a three-phase rectifier of a corresponding inverter stage 42 of the three-phase multilevel inverter 40.

The multilevel inverter 40 includes 18 inverter stages 42, each connected to a corresponding secondary 34 of the transformer 30 as shown. The inverter 40 is a 13-level inverter with 6 cascaded H-Bridge inverter stages 42U-1 through 42U-6 having outputs 41U-1 through 41U-6 connected in series with one another (cascaded) between a motor drive neutral point N and a first winding U of a three-phase motor load 60. Similarly, six inverter stages 42V-1 through 42V-6 provide series connected voltage outputs 41V-1 through 41V-6 between the neutral N and the second winding V, and six inverter stages 42W-1 through 42W-6 provide series connected voltage outputs 41W-1 through 41W-6 between the neutral N and the third winding W of the motor 60. The inverter stages 42 are individually operable according to a plurality of switching control signals 49 from the controller 48. Specifically, the controller 48 provides control signals 49U to the inverter stages 42U-1 through 42U-6 associated with the first motor winding U, and also provides control signals 49V to the inverter stages 42V-1 through 42V-6 and control signals 49W to the inverter stages 42W-1 through 42W-6.

Referring also to FIGS. 2 and 3, the controller 48 can be implemented using any suitable hardware, processor executed software or firmware, or combinations thereof, wherein an exemplary embodiment of the controller 48 includes one or more processing elements such as microprocessors, microcontrollers, DSPs, programmable logic, etc., along with electronic memory, program memory and signal conditioning driver circuitry, with the processing element(s) programmed or otherwise configured to generate signals 49 suitable for operating the switching devices of the inverter stages 42.

FIG. 2 illustrates an exemplary H-Bridge inverter stage 42 having onboard rectifier diodes D1-D6 forming a three-phase rectifier which receives three-phase AC power from the corresponding transformer secondary 34 and provides DC power across a DC capacitor C as an input to an H-Bridge inverter formed by four switching devices S1-S4 configured in an "H" bridge circuit. Although the illustrated inverter stages 42 each include rectifier circuitry driven by an AC input from the corresponding transformer secondary 34, any suitable form of a DC input can be provided to the inverter stages 42 in accordance with the present disclosure, and the inverter stages 42 may, but need not, include onboard rectification circuitry. In addition, any suitable switching circuit configuration can be used in the individual stages 42 having at least two switching devices S configured to selectively provide voltage at the stage output 41 of at least two distinct levels. Moreover, any suitable type of switching devices S may be used in the inverter stages 42, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc.

The illustrated four-switch H-Bridge implementation (FIG. 2) advantageously allows selective switching control signal generation by the controller 48 to provide at least two distinct voltage levels at the output 41 in a controlled fashion. For instance, a positive voltage is provided at the output terminals 41A and 41B of a positive DC level substantially equal to the DC bus voltage VDC across the capacitor C (+VDC) when the switching devices S1 and S4 are turned on (conductive) while the other devices S2 and S3 are off (non-conductive). Turning switches S2 and S3 on while S1 and S4 are off results in a negative voltage (−VDC) being applied at the output 41. With the upper switches S1 and S3 on and with S2 and S4 off (or vice versa), the output voltage of the stage 42 is zero V. Accordingly, the exemplary H-Bridge inverter stage 42 advantageously allows selection of three different output voltages, and the cascaded configuration of six such stages (e.g., FIGS. 1 and 3) allows selective switching control signal generation by the controller 48 to implement 13 different voltage levels for application to the corresponding motor phase. It is noted that other possible switching circuitry may be used to implement a 2, 3, or K-level selectable output for individual stages 42, where K is an integer greater than 1.

FIG. 2 illustrates one possible implementation of comparison logic or circuitry in the controller 48 for providing switching control signals 49 to a given inverter stage 42, where the controller 48 may also include signal level amplification and/or driver circuitry (not shown) to provide suitable drive voltage and/or current levels sufficient to selectively actuate the switching devices S1-S4. In this regard, the controller 48 generates a set of 12 carrier waveforms for each of the motor phases U, V, W (or a single set of 12 carriers may be used for all three phases), with a pair of carriers 43, 45 corresponding to each stage 42 including a first carrier 43 (CARRIER+) and a second carrier 45 (CARRIER−). The individual carriers 43, 45 may be generated as a voltage signal waveform and/or may be digital waveform values generated numerically using a processor in the controller 48. The carrier waveform signals or values 43, 45, moreover, individually define a periodic carrier waveform with a waveform period P, with the waveform periods of the waveform set being substantially equal in certain embodiments. The waveforms 43, 45, moreover, are preferably the same shape throughout the set, although this is not a strict requirement of all embodiments of the present disclosure. In addition, any suitable waveform shape can be used, such as triangular waveforms 43, 45 as illustrated and described further hereinafter, or other shapes such as sawtooth waveforms, sine waves, etc. (not shown).

The controller 48 provides individual switching control signals 49 to each of the switching devices S1-S4 in the illustrated example, although certain of the switching control signals may be combined or shared in some embodiments. The controller 48 generates the switching control signals 49 based on a comparison of the first and second carrier waveform signals or values 43, 45 associated with each given inverter stage 42 with a reference signal or value 47. In the illustrated embodiment, a separate reference signal or value 47 is used for each motor phase U, V, W of the motor 60, such as a reference voltage corresponding to a desired (e.g., setpoint) value to which the corresponding motor phase is to be driven by the motor drive 10. In the embodiment of FIG. 2, moreover, comparators 44 and 46 are provided which to compare the reference signal or value 47 with the positive and negative carrier waveform signals or values 43 and 45, respectively.

In this implementation, when the reference 47 is greater than the positive carrier 43, the comparator 44 turns on switch S1 and, through inverter 44a, turns off switch S2 of the inverter stage 42. The negative carrier 45 in this embodiment has a negative profile, whether in the form of a signal or a value, and when the reference 47 goes below the negative carrier 45, switch S3 is turned on through inverter 46a and switch S4 is turned off. In this manner, when switches S2 and S3 are on per the table in FIG. 2 the output of the corresponding inverter stage 42 attempts to decrease the voltage applied to the corresponding motor phase, thereby also facilitating tracking of the reference 47. Moreover, when the reference 47 is between the positive carrier 43 and the negative carrier 45, switches S2 and S4 are on in the corresponding inverter stage 42. In this condition, the corresponding inverter stage 42 does not add or subtract voltage from the net inverter output for the corresponding motor phase, with the phase voltage being controlled by selective switching of other inverter stages 42 in the cascade configuration for that phase.

Referring also to FIG. 3, the controller 48 similarly implements comparison schemes corresponding to each of the series-connected inverter stages 42 in a controlled fashion so as to cause the corresponding output voltage for each of the motor phases U, V and W to track their respective reference signals or values 47. FIG. 3 illustrates carrier waveform comparison circuitry or logic 43, 44, 45, 46 and 47 in the controller 48 for the six cascaded H-Bridge inverter stages 42U-1 through 42U-6 to drive the motor phase U in the power converter 10 of FIG. 1. It is noted that the comparators 44 and 46 in FIGS. 2 and 3 are schematic representations, and if the reference 47 and carriers 43 and 45 are implemented as analog signals (e.g., voltage signals), actual hardware comparators 44 and 46 may be used. Alternatively, if the controller 48 implements a digital pulse width modulation, the reference 47 and the carrier waveforms 43 and 45 may be implemented as values, and the function of the comparators 44 and 46 may be implemented as processor-executed software or firmware, programmable logic, etc.

Figure 4:
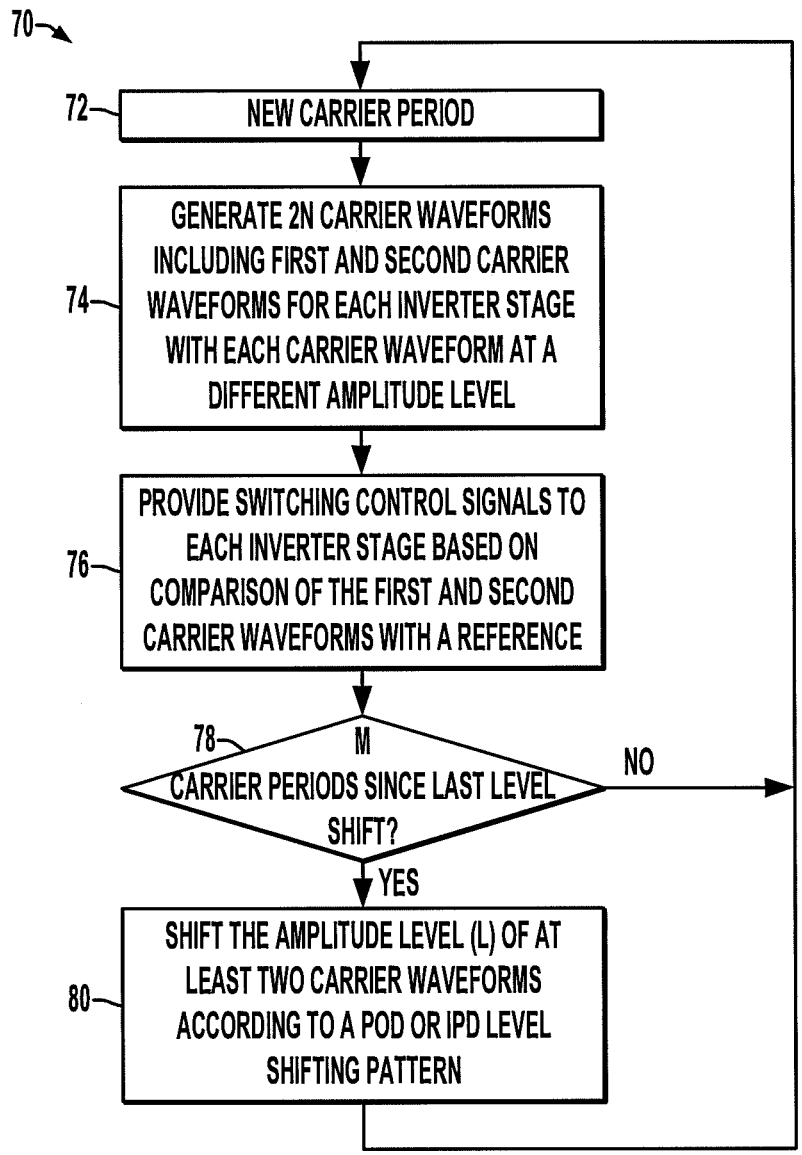
FIG. 4 is a flow diagram illustrating an exemplary method for generating multilevel inverter switching control signals in accordance with further aspects of the disclosure.

Referring also to FIGS. 3, 4 and 5A-5F, the controller 48 generates the switching control signals 49 for the inverter stages 42 of the inverter 40 according to an exemplary process 70 illustrated in FIG. 4, in which the amplitude levels L of at least two of the carrier waveforms 43, 45 are shifted according to a repeating level shifting pattern 50. In certain embodiments, the controller 48 includes at least one processor programmed to perform the process 70 and other functionality set forth herein according to computer executable instructions from a non-transitory computer readable medium, such as a computer memory, a memory within a power converter control system (e.g., controller 48), a CD-ROM, floppy disk, flash drive, database, server, computer, etc. which has computer executable instructions for performing the processes and controller functionality described herein. While the exemplary method 70 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide the carrier waveform amplitude level shifting rotation concepts disclosed herein.

In the illustrated system 10, the controller 48 shifts the amplitude levels L of two or more of the carrier waveform signals or values 43, 45 every integer number M waveform periods P according to the shifting pattern 50. It is noted that such patterns 50 may optionally include dwell periods in which the pattern dwells for one or more carrier cycles before shifting resumes in a repeating overall pattern, where such implementations are referred to herein as shifting amplitude levels every M waveform periods (e.g., FIGS. 7 and 8 below). Without wishing to be tied to any particular theory, it is believed that this controlled rotational level shifting or level adjustment by the controller 48 facilitates low output line-line voltage total harmonic distortion (THD) and low input voltage and current THD, while mitigating uneven power distribution in the cascaded inverter stages 42.

As seen in FIG. 4, for each new carrier period P beginning at 72, a set of 2N (e.g., 12 in the illustrated example) carrier waveforms (signals or values or combinations thereof) are generated at 74, where the set includes first and second carrier waveforms 43 and 45 for each inverter stage 42, with each carrier waveform 43, 45 is set to a different amplitude level L in each carrier waveform period P.

Graphs 100, 110, 120, 130, 140 and 150 in FIGS. 5A-5F, respectively, show an exemplary sawtooth POD level shifting pattern for six pairs of carrier waveforms: CR1+ & CR1− (43-U1 & 45-U1) provided to the comparators 44-U1 & 46-U1 for creating switching control signals 49-U1 for operating the first cascaded inverter stage 42-U1 for motor phase U of the 13-level CHB inverter of FIG. 3; CR2+ & CR2− (43-U2 & 45-U2) provided to comparators 44-U2 & 46-U2 for creating switching control signals 49-U2 for the second inverter stage 42-U2; CR3+ & CR3− (43-U3 & 45-U3) provided to comparators 44-U3 & 46-U3 used to create switching control signals 49-U3 for inverter stage 42-U3; CR4+ & CR4− (43-U4 & 45-U4) provided to the comparators 44-U4 & 46-U4 for generating switching control signals 49-U4 for inverter stage 42-U4; CR5+ & CR5− (43-U5 & 45-U5) provided to the comparators 44-U5 & 46-U5 for generating switching control signals 49-U5 for inverter stage 42-U5; and CR6+ & CR6− (43-U6 & 45-U6) provided to the comparators 44-U6 & 46-U6 for generating switching control signals 49-U6 for operating the sixth inverter stage 42-U6.

The controller 48 generates the set of carrier waveforms 43, 45 (FIG. 3) at 74 in FIG. 4 such that each carrier is at a different amplitude level L, with the amplitude levels of the carrier set 43, 45 each being within an expected amplitude range AR of the reference signal or value 47. The carrier set in the 13-level example of FIG. 3 includes 12 carrier waveforms (six positive carriers 43-U1, 43-U2, 43-U3, 43-U4, 43-U5 and 43-U6, and six negative carriers 45-U1, 45-U2, 45-U3, 45-U4, 45-U5, and 45-U6) for the first motor phase U. As seen in FIGS. 5A-5F, for example, the controller 48 generates the carrier set 43, 45 for each carrier waveform period P such that each carrier 43, 45 is at a different one of a plurality of non-overlapping amplitude levels L6−, L5−, L4−, L3−, L2−, L1−, L1+, L2+, L3+, L4+, L5+, L6+ within the expected amplitude range AR of a reference signal or value 47. In the illustrated example, moreover, half of the amplitude levels L1+, L2+, L3+, L4+, L5+, L6+ are within a first (e.g., positive or upper) subrange SR1 of the reference signal range AR, and the remaining levels L6−, L5−, L4−, L3−, L2−, L1− are in a second (e.g., negative or lower) subrange SR2 of the range AR. In this implementation, the first carrier 43 for each inverter stage 42 is in the first subrange SR1 and the second carrier 45 for each given inverter stage 42 is in the second subrange SR2, although not a strict requirement of all embodiments of the present disclosure. In the illustrated implementations, moreover, the levels L are non-overlapping, and preferably cover each possible amplitude level within the range AR, and the level shifting patterns 50 illustrated and described herein ensure that a carrier 43, 45 is provided in each of the illustrated amplitude levels L during each of the carrier cycles or periods P, although these further conditions are not strict requirements all embodiments of the present disclosure.

At 76 in FIG. 4, with the set of carriers 43, 45 generated for each inverter stage 42, the controller 48 provides switching control signals 49, in which the signals 49 for a given inverter stage 42 are based on comparison of the first and second carrier waveform signals or values 43, 45 for that particular stage 42 with the reference signal or value 47 for the corresponding motor phase, for example as described above using hardware and/or processor-executed firmware/software to implement the functionality of the comparators 44, 46 shown in FIGS. 2 and 3.

A determination is made at 78 in FIG. 4 as to whether shifting is to be done for the next carrier cycle (e.g., whether an integer number M carrier cycles have occurred since the last level shift, where M is greater than zero). If not (NO at 78), the controller generates carrier waveforms and switching control signals for the next carrier cycle or period at 74 and 76 as described above. Otherwise (YES at 78), the controller 48 shifts the amplitude level L of at least two of the carrier waveform signals or values 43, 45 for the next carrier waveform period P at 80 according to the repeating level shifting pattern 50. Other embodiments are possible (e.g., see FIGS. 7 and 8 below) in which dwelling is used at one or more points in a given rotation pattern 50.

Figure 5A:
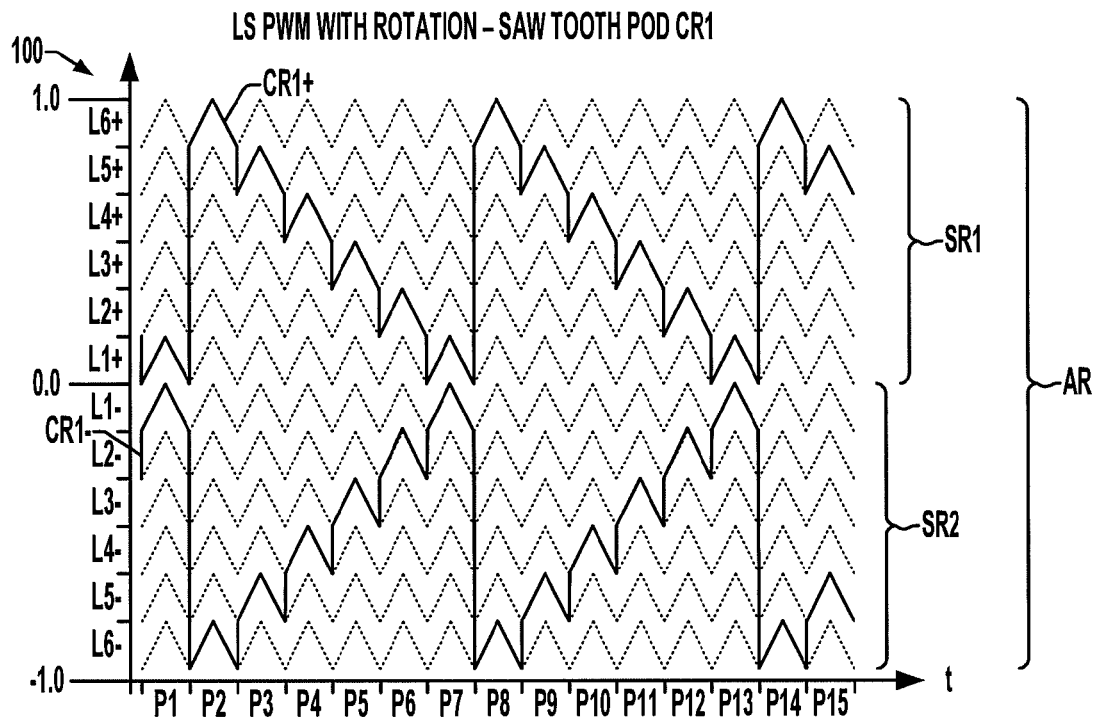
FIGS. 5A-5F are graphs illustrating an exemplary sawtooth phase-opposite disposition (POD) level shifting pattern for six pairs of carrier waveforms in one phase of the CHB inverter of FIG. 1.
Figure 5B:
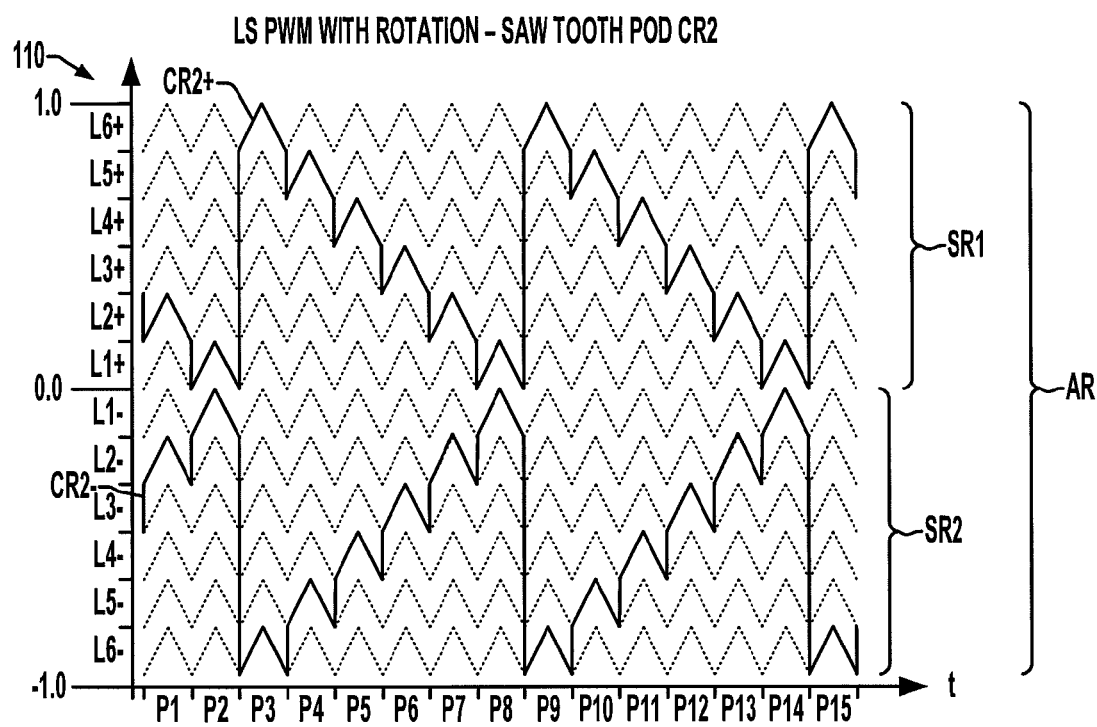
Figure 5C:
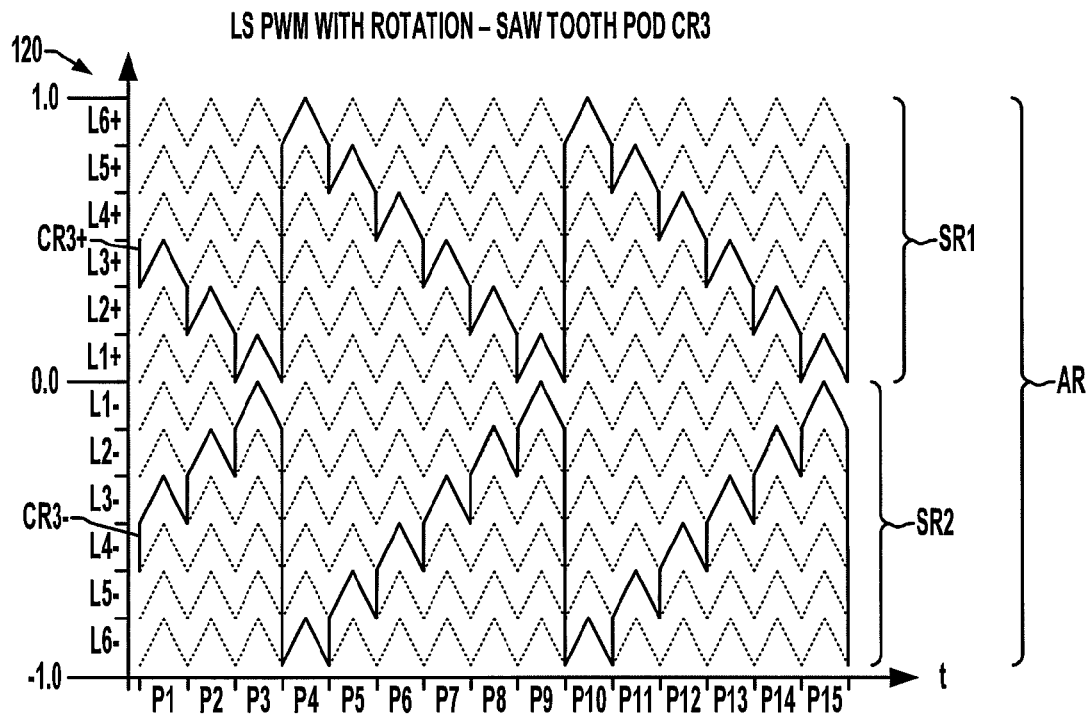
Figure 5D:
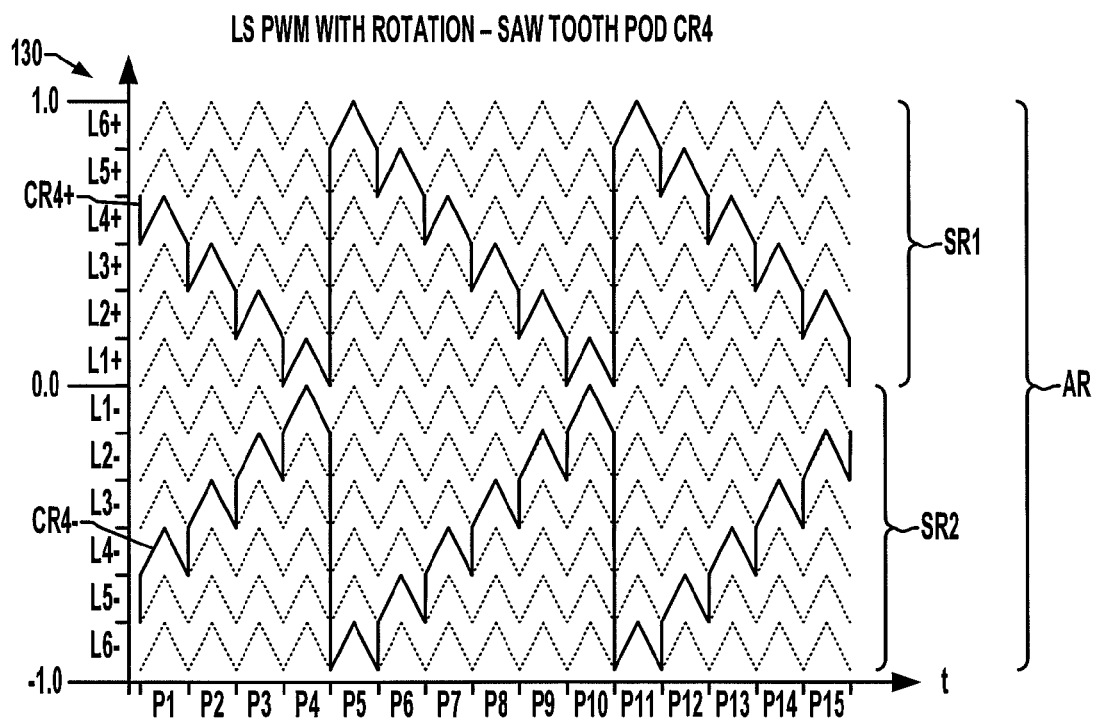
Figure 5E:
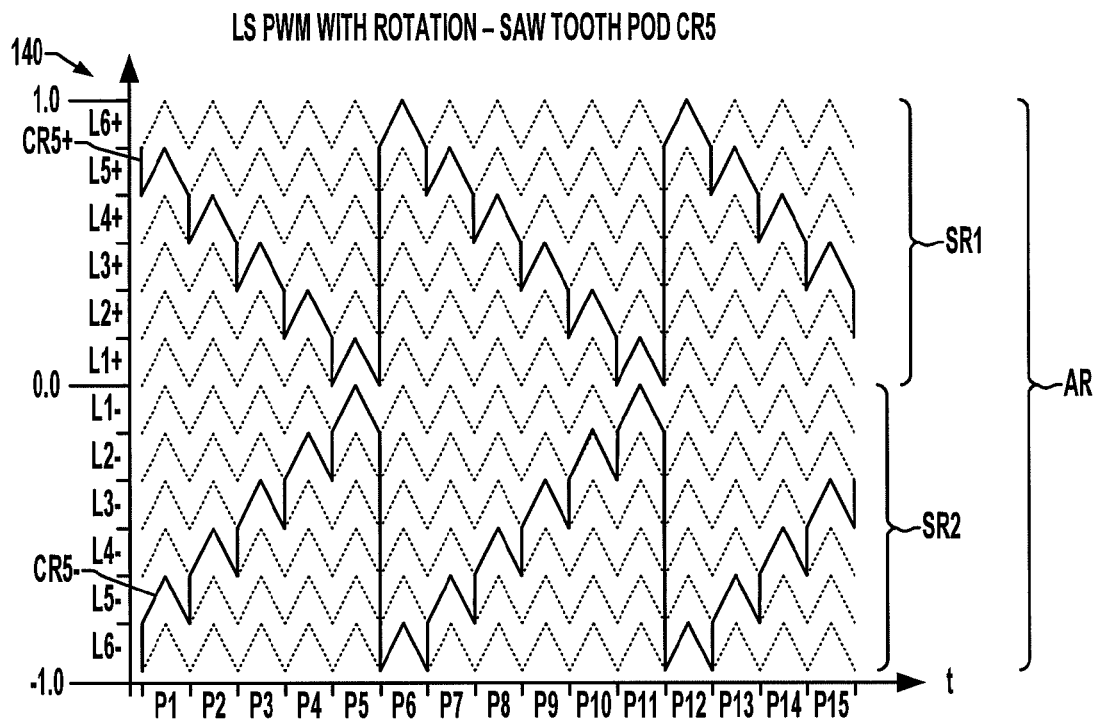
Figure 5F:
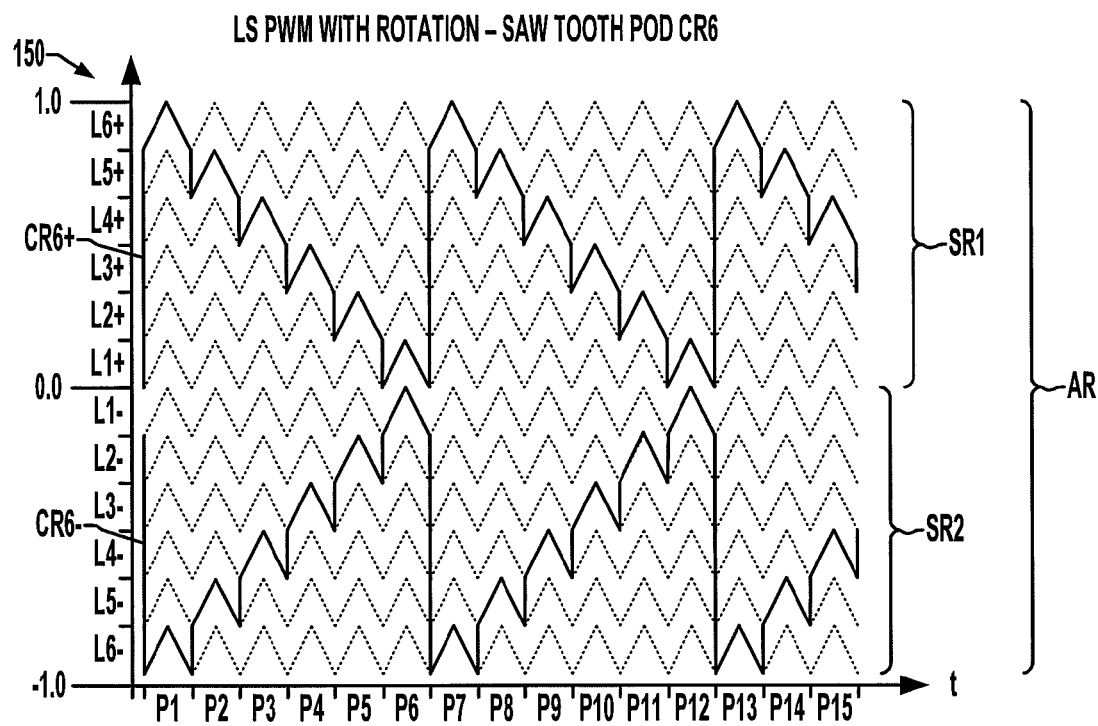

Referring also to FIGS. 5A-5F, the level shifting pattern 50 in certain embodiments is a phase-opposite disposition (POD) or is an in-phase disposition (IPD) level shifting pattern 50, and other types and configurations of shifting patterns 50 can be used. The pattern 50 in FIGS. 5A-5F is a sawtooth POD level shifting example in which the positive and negative (first and second) carriers 43 and 45 are in the subranges SR1 and SR2, respectively. In this example, FIG. 5A shows the amplitude level positions of the carrier waveforms CR1+ and CR1− used in generating the switching control signals 49-U1 for the first inverter stage 42-U1, which occupy slots L1+ and L1− during the first illustrated carrier cycle P1, and then shift by one position in each succeeding carrier period. In this pattern 50, the respective amplitude level positions for CR1+ and CR1− each form a "sawtooth" pattern, with CR1+ being shifted to positions L6+, L5+, L4+, L3+ and L2+ in the carrier cycle periods P2, P3, P4, P5 and P6, respectively, after which the pattern repeats. CR1+ and CR1−, however, are in "phase-opposition" or "phase-opposite" disposition relative to one another with respect to the pattern 50 in FIGS. 5A-5F, with CR1− being ramped through shifting in the opposite direction than is CR1+. In this regard, CR1− is shifted within the subrange SR2 to positions L6−, L5−, L4−, L3− and L2− in the carrier cycle periods P2, P3, P4, P5 and P6, respectively. The same is true for the other carrier waveform pairs: CR2+ & CR2− (associated with the second cascaded inverter stage 42-U2, FIG. 5B); CR3+ & CR3− (inverter stage 42-U3, FIG. 5C); CR4+ & CR4− (inverter stage 42-U4, FIG. 5D); CR5+ & CR5− (stage 42-U5, FIG. 5E); and CR6+ & CR6− (stage 42-U6, FIG. 5F), with the locations being offset from one another such that in each of the periods or cycles P of the carrier waveforms, each amplitude level L is occupied.

It is noted that the carrier waveforms 43, 45 in these examples and another examples discussed below utilize triangle waveforms. However, any form or shape of carrier waveforms may be used, and the waveforms 43, 45 of a given set generated by the controller 48 may, but need not, be of the same shape, and may, but need not, be in phase with one another. In addition, although the illustrated examples include first and second carrier waveforms associated with each individual inverter stage 42 with one carrier in the first (e.g., positive) subrange SR1 and the other carrier for that inverter stage 42 in the second (e.g., negative) subrange SR2, other embodiments are possible in which the carrier waveforms associated with a given inverter stage 42 can be within the same subrange SR1 or SR2 in a given carrier waveform cycle P or in all the carrier waveform cycles P.

Figure 6:
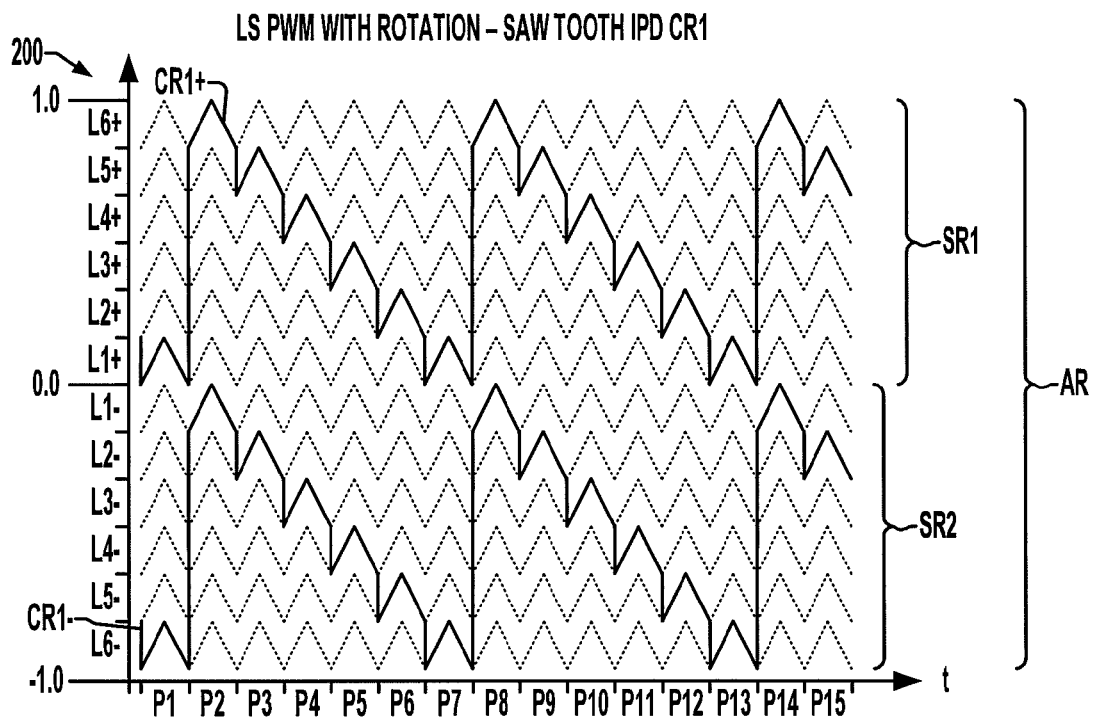
FIG. 6 is a graph illustrating an exemplary sawtooth in-phase disposition (IPD) level shifting pattern for one exemplary pair of carrier waveforms in the CHB inverter of FIG. 1.

FIG. 6 provides a graph 200 illustrating an exemplary sawtooth in-phase disposition (IPD) level shifting pattern for one exemplary pair of carrier waveforms CR1+ & CR1− (43-U1 and 45-U1 in the example of FIG. 3 above). Similar shifted amplitude level waveform patterns are provided in this implementation for the other carrier waveform pairs (not shown) with the amplitude levels being offset from one another such that in each of the periods or cycles P of the carrier waveforms 43, 45, each amplitude level L is occupied. In this case, similar to those of FIGS. 5A-5F above, the amplitude level L is shifted for each carrier 43, 45 in each succeeding waveform period P by one incremental level. Thus, as shown in FIG. 6, the carrier CR1+ (43-U1 in FIG. 3) is positioned at amplitude level L1+ in the first illustrated waveform cycle P1 and is thereafter shifted by the controller 48 to positions L6+, L5+, L4+, L3+ and L2+ in the successive carrier cycle periods P2, P3, P4, P5 and P6, respectively, after which the pattern repeats. Unlike the POD example of FIGS. 5A-5F, however, the IPD pattern in FIG. 6 maintains a constant distance between the first and second carriers CR1+ & CR1− (43-U1 and 45-U1) with CR1− being located at level L6− in the period P1 and thereafter being ramped within the subrange SR2 to positions L1−, L2−, L3−, L4− and L5− in the succeeding carrier cycle periods P2, P3, P4, P5 and P6, respectively. In this manner, the carriers CR1+ and CR1− are "in-phase" with one another, and hence this example is an IPD pattern.

Figure 7:
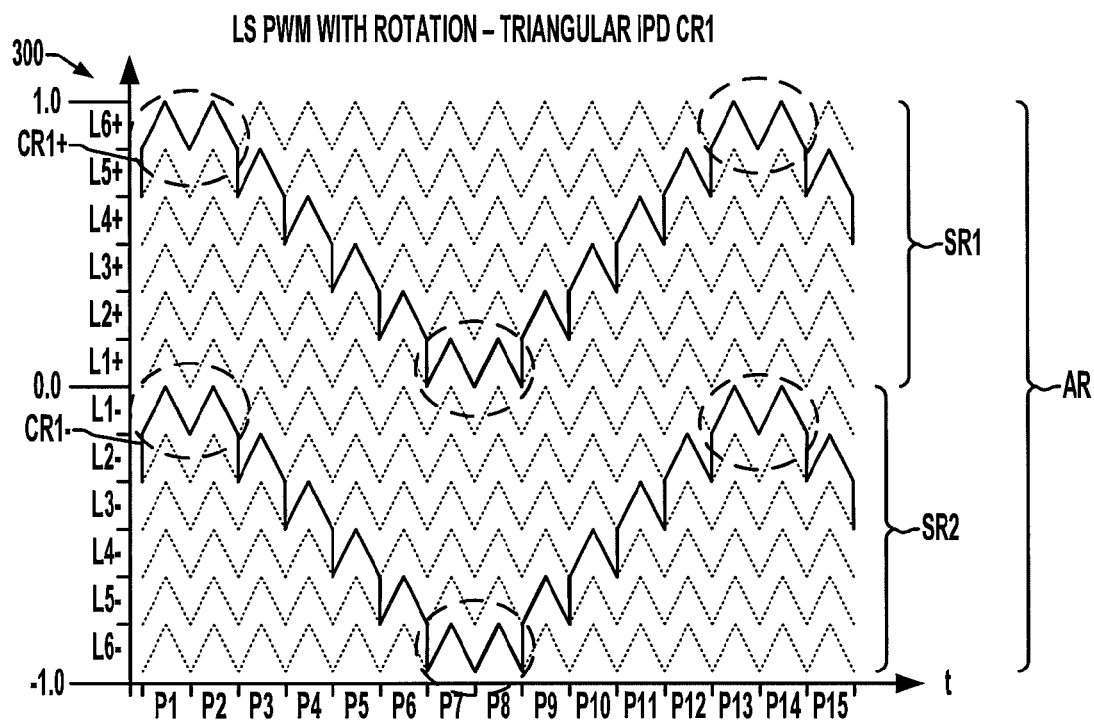
FIG. 7 is a graph illustrating exemplary triangular IPD level shifting pattern for one exemplary pair of carrier waveforms in the CHB inverter of FIG. 1.

Another IPD example is illustrated in the graph 300 of FIG. 7, this time providing a triangular pattern through successive shifting of the carrier waveforms 43 and 45 in every period P with dwelling. This example is again illustrated with respect to the first carrier waveform pair CR1+ and CR1−, and similar patterns are applied to the other carrier pairs (not shown) with each amplitude level L being occupied by one carrier in each of the carrier waveform cycles P. As seen in FIG. 7, the first carrier CR1+ is positioned at level L6+ and the second carrier CR1− is at level L1− during the first and second illustrated carrier cycles P1 and P2. From there, CR1+ is subsequently shifted to positions L5+ at P3, L4+ at P4, L3+ at P5, L2+ at P6, and remains at level L1+ for the carrier periods P7 and P8. Thereafter, the triangular pattern in FIG. 7 shifts CR1+ upward through the levels L2+ at cycle P9, L3+ at P10, L4+ at P11, and L5+ at P12, and then remains at the top level L1+ for two cycles P13 and P14. As seen in FIG. 7, each carrier is shifted downward one level L in successive cycles P (e.g., P2 through P7) and then reverses direction with the shifting being upward by one level L each period P (P8 through P13). Thus, the level shifting pattern 50 in FIG. 7 is triangular. Moreover, this pattern 50 also maintains a constant distance between the first and second carriers CR1+ & CR1− for each inverter stage 42 and is thus an in-phase disposition (IPD) level shifting pattern.

It is noted in the graph 300 of FIG. 7 that the carriers CR1+ and CR1− remain at the end levels L6+, L1+, L1− and L6− for two consecutive cycles (P1 & P2; P7 & P8; P13 & P14; etc.) as the pattern repeats, and during such dwelling periods (circled in dashed line in the figure), at least two of the other carriers of the set are shifted accordingly such that all levels L are occupied by one of the carrier waveforms 43, 45 during each of the cycles P. In other triangular pattern embodiments, the pair of carriers CR1+ and CR1− may remain at one or more different levels L for more than one waveform period P. Furthermore, still other embodiments are possible in which no dwelling is done for any of the carriers 43, 45.

Figure 8:
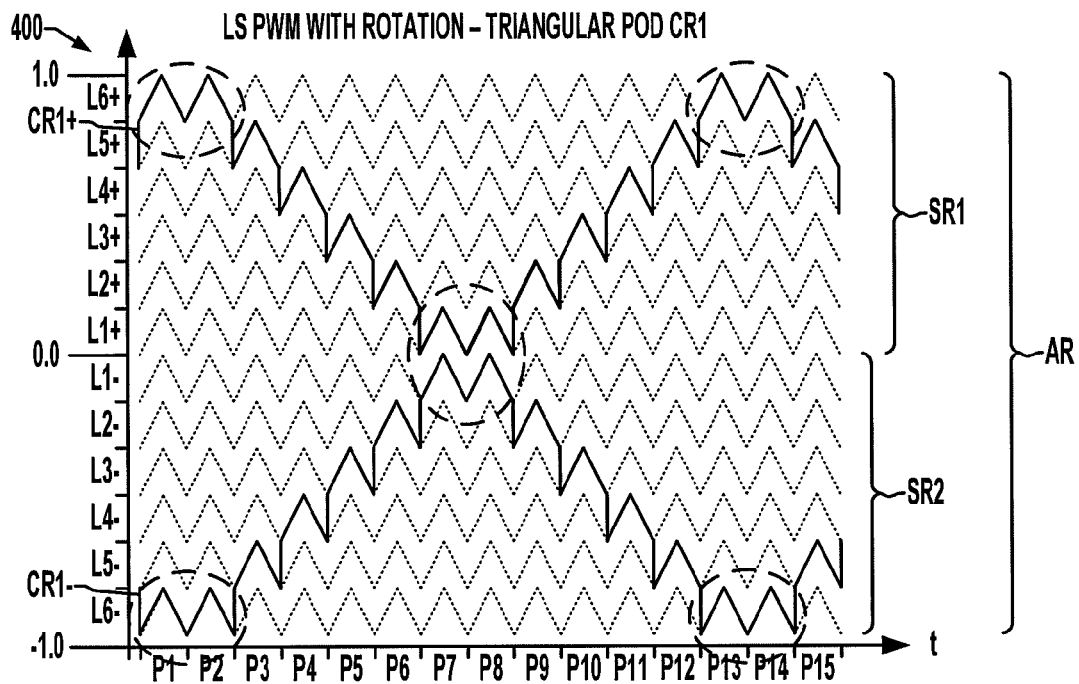
FIG. 8 is a graph illustrating an exemplary triangular POD level shifting pattern for one exemplary pair of carrier waveforms in the inverter of FIG. 1.
Figure 9:
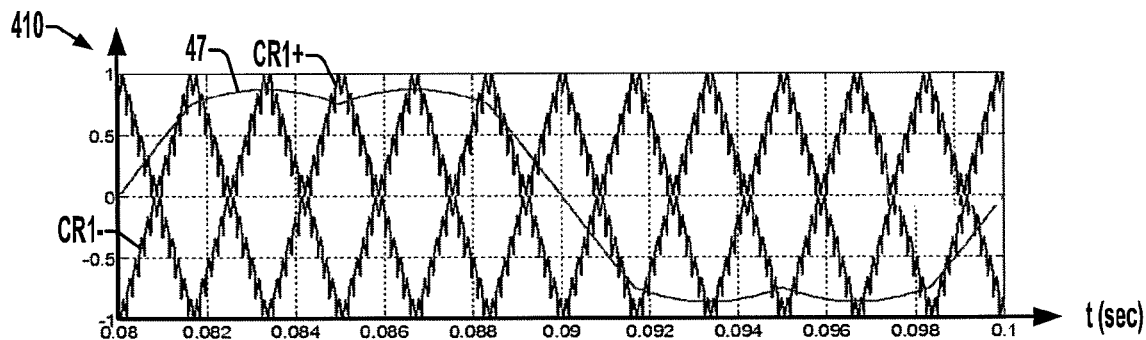
FIG. 9 is a graph illustrating the carrier waveform pair shifted according to the triangular POD level shifting pattern of FIG. 8 along with a corresponding voltage reference signal or value in the inverter of FIG. 1.
Figure 10:
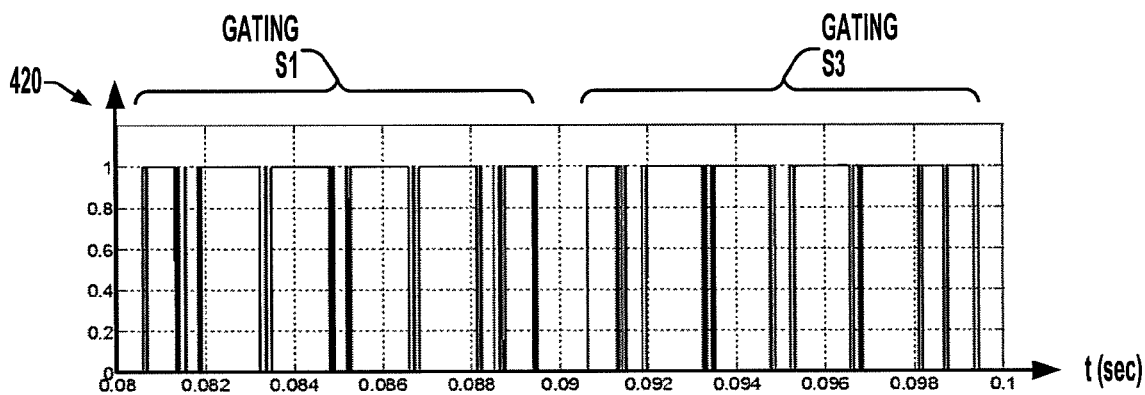
FIG. 10 is a graph illustrating exemplary switching control signals for switching devices of the H-Bridge inverter stage generated using the level shifted carrier waveform pair of FIGS. 8 and 9.
Figure 11A:
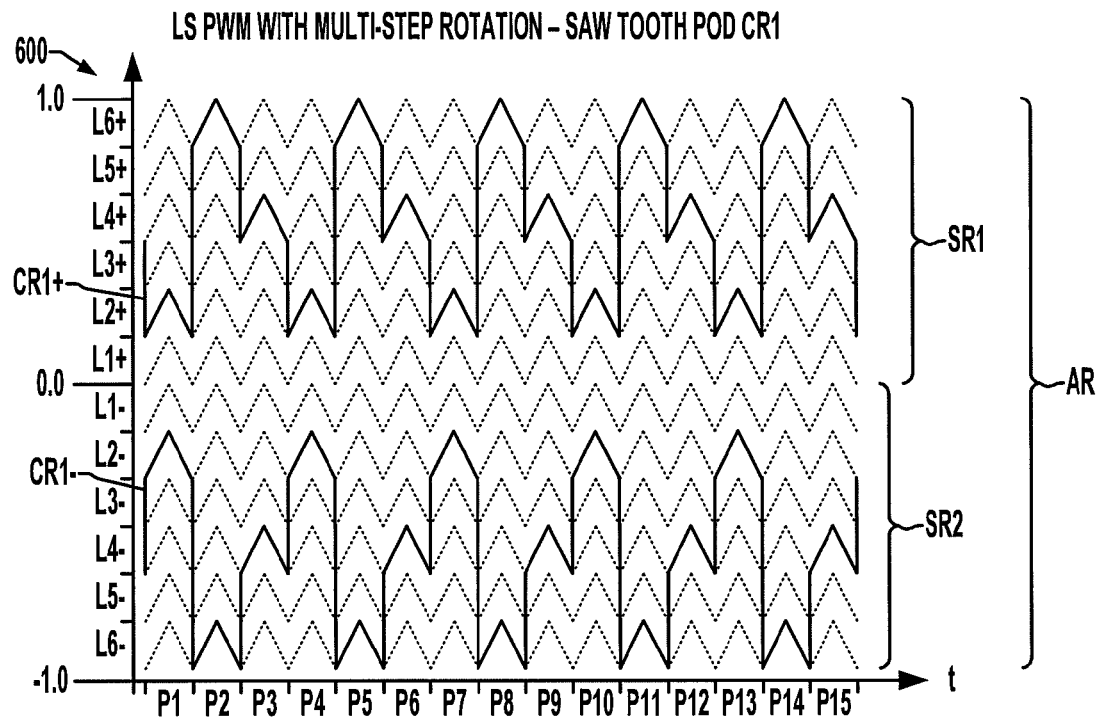
FIGS. 11A-11F are graphs illustrating another exemplary sawtooth POD level shifting pattern for six pairs of carrier waveforms in which each carrier is shifted by two amplitude levels every carrier cycle in the inverter of FIG. 1.
Figure 11B:
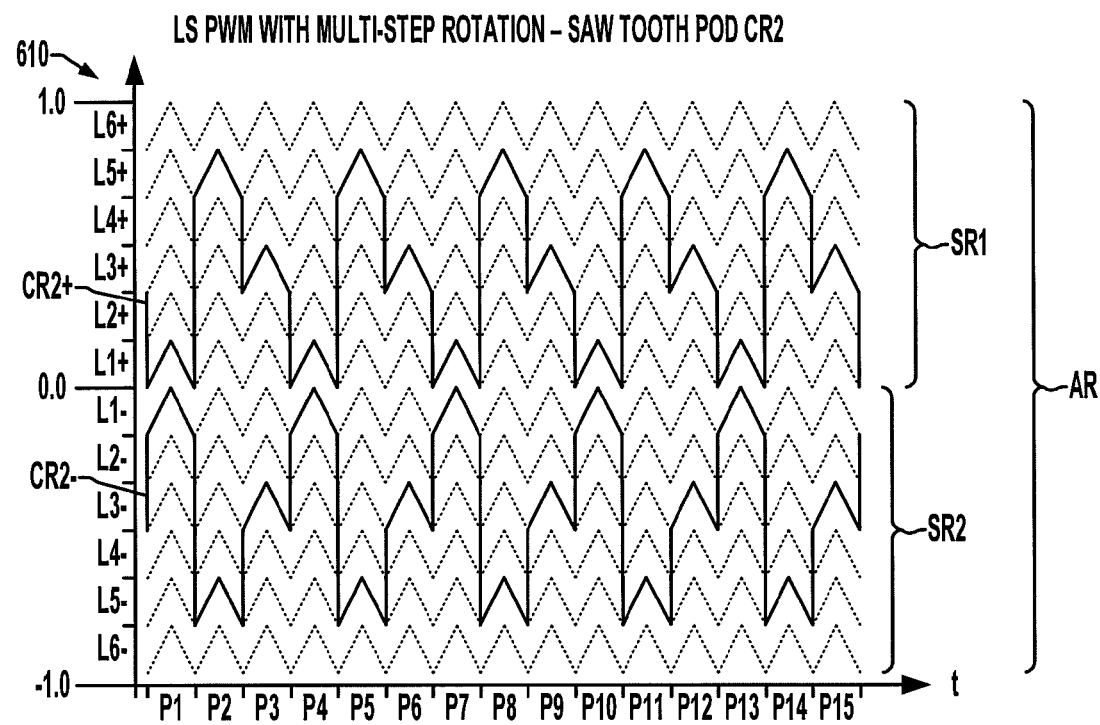
Figure 11C:
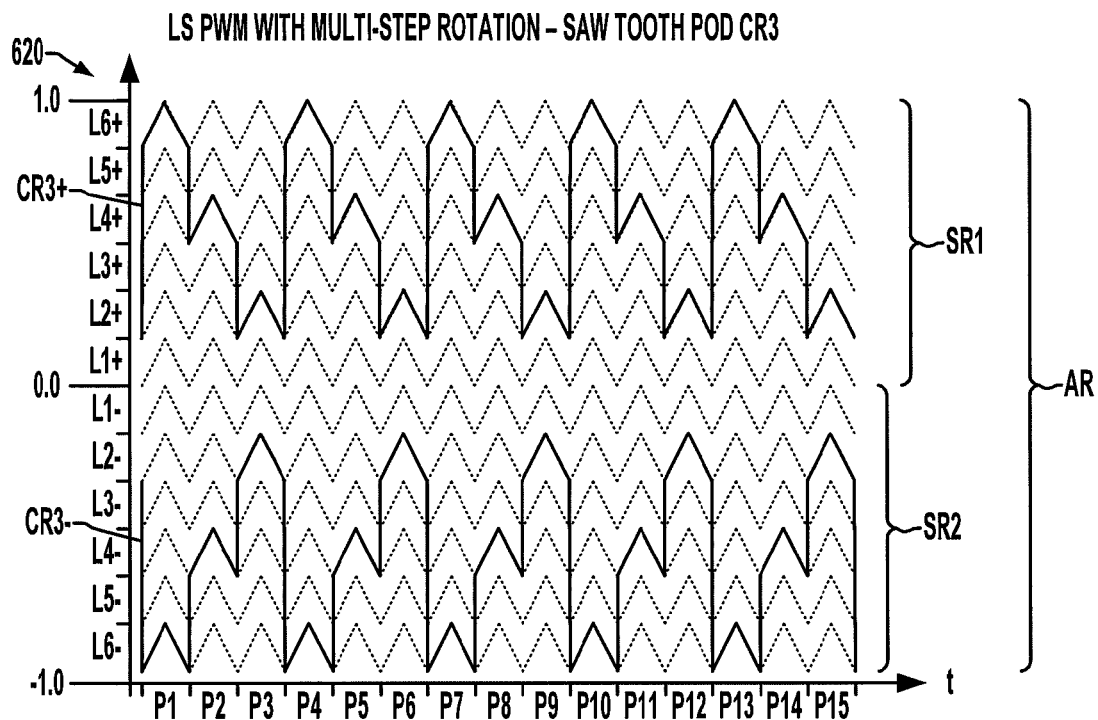
Figure 11D:
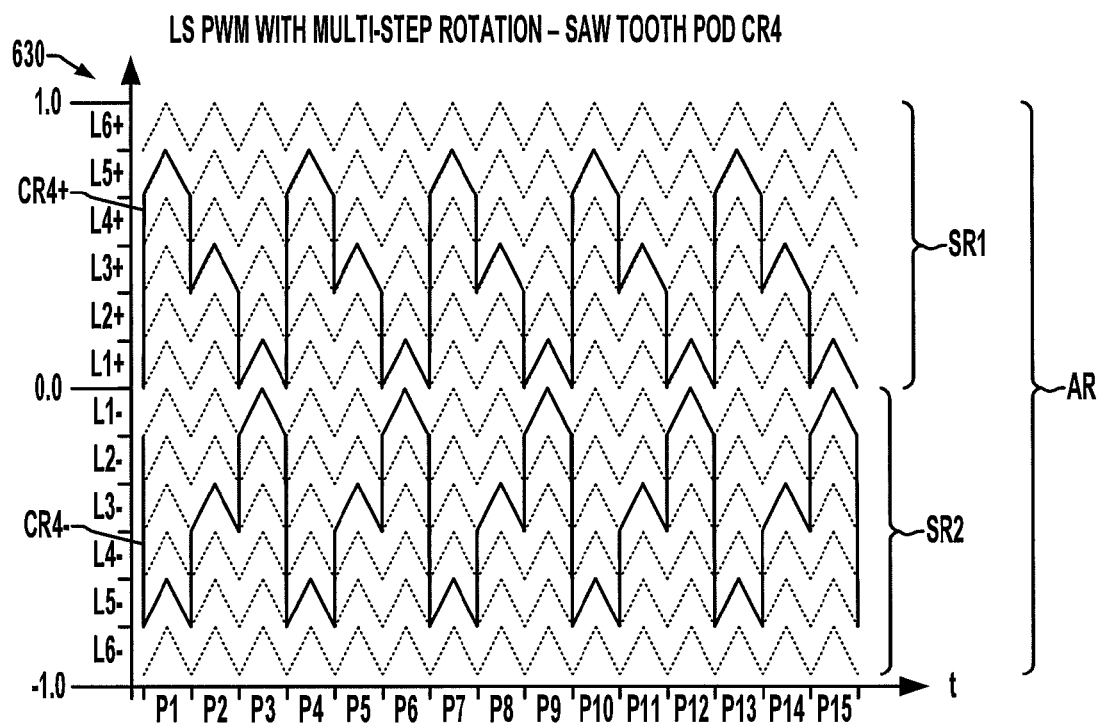
Figure 11E:
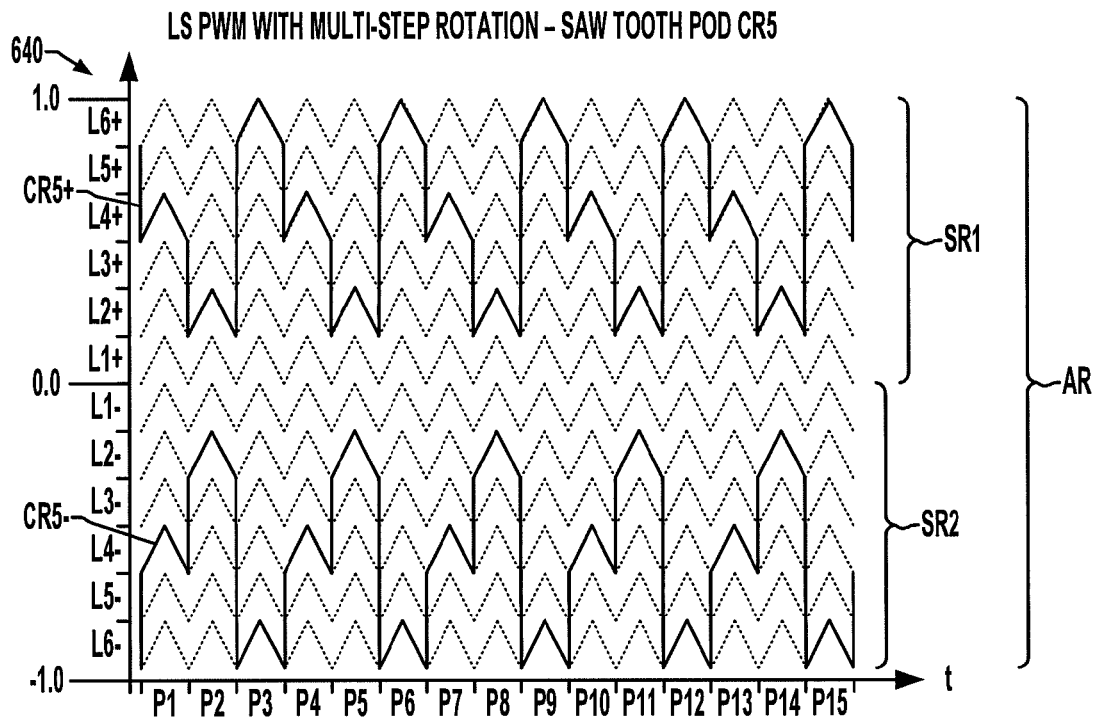
Figure 11F:
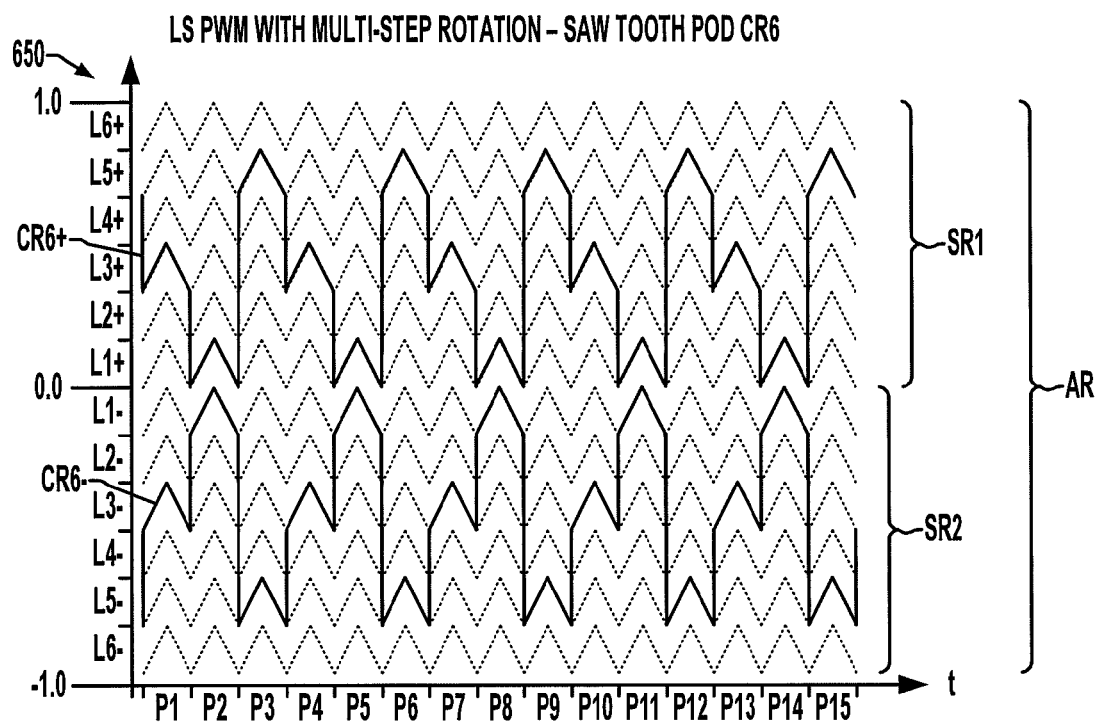
Figure 12A:
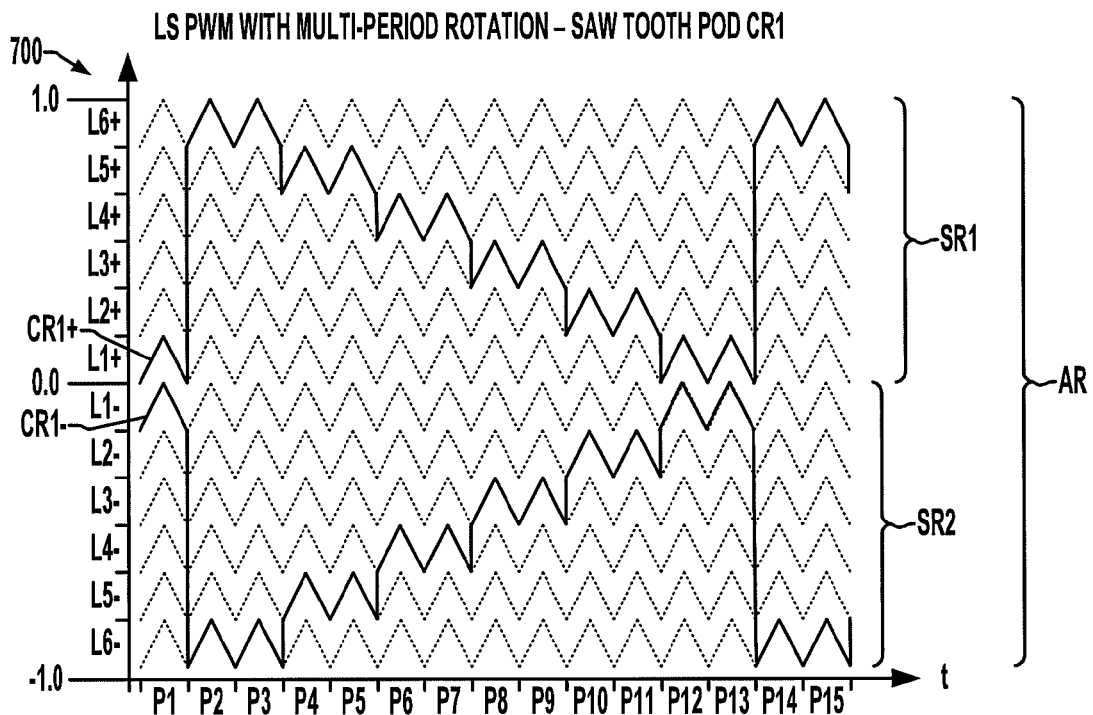
FIGS. 12A-12F are graphs illustrating yet another exemplary sawtooth POD level shifting pattern for six pairs of carrier waveforms in which each carrier is shifted by a single amplitude level every two carrier cycles in the inverter of FIG. 1.
Figure 12B:
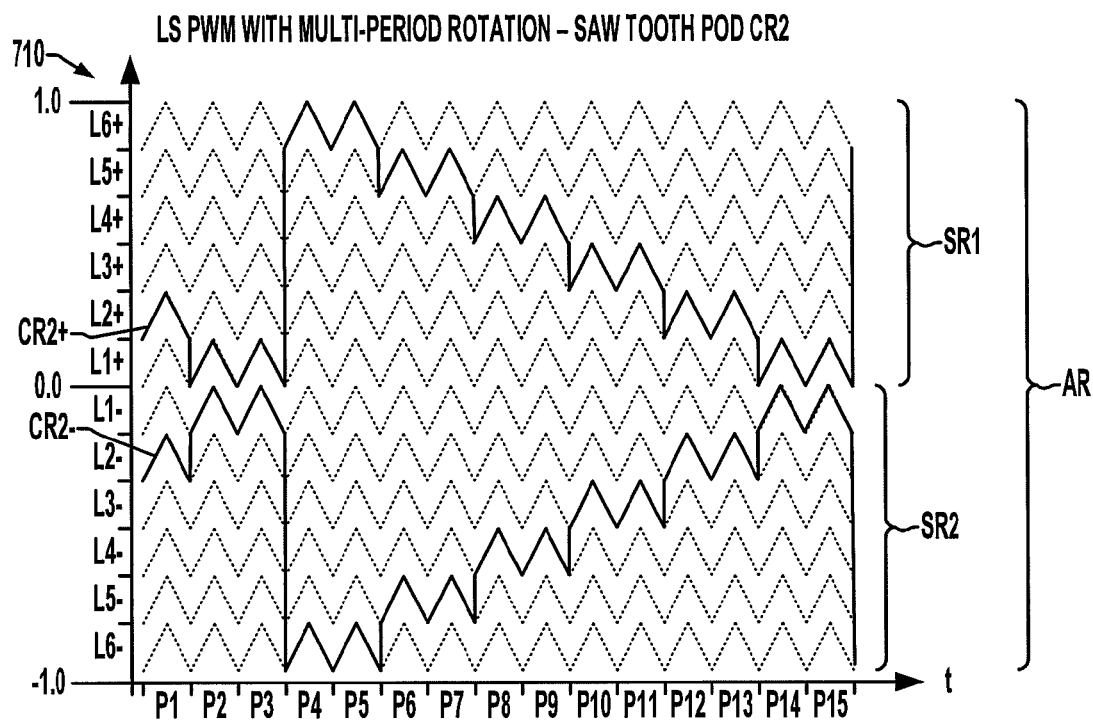
Figure 12C:
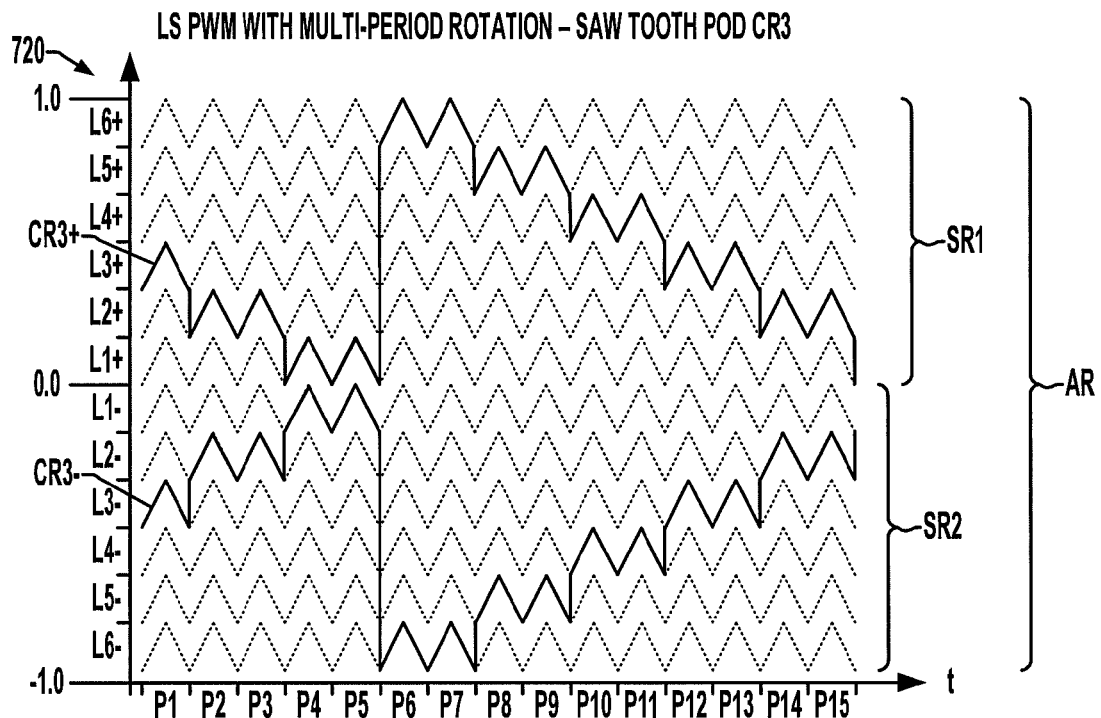
Figure 12D:
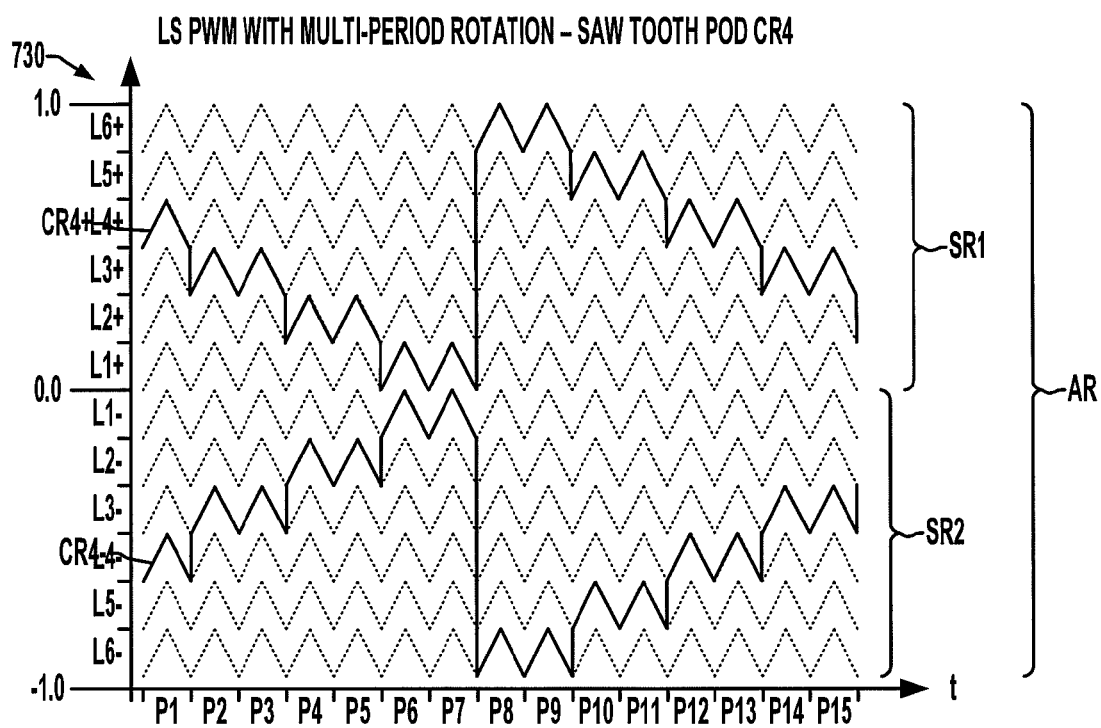
Figure 12E:
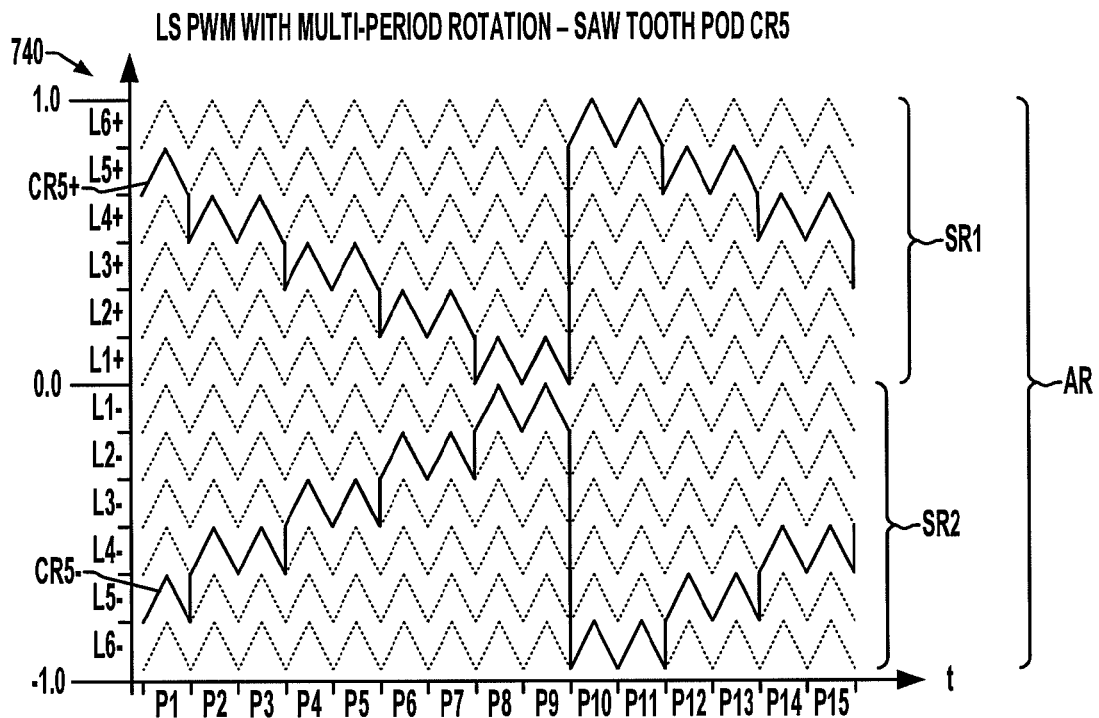
Figure 12F:
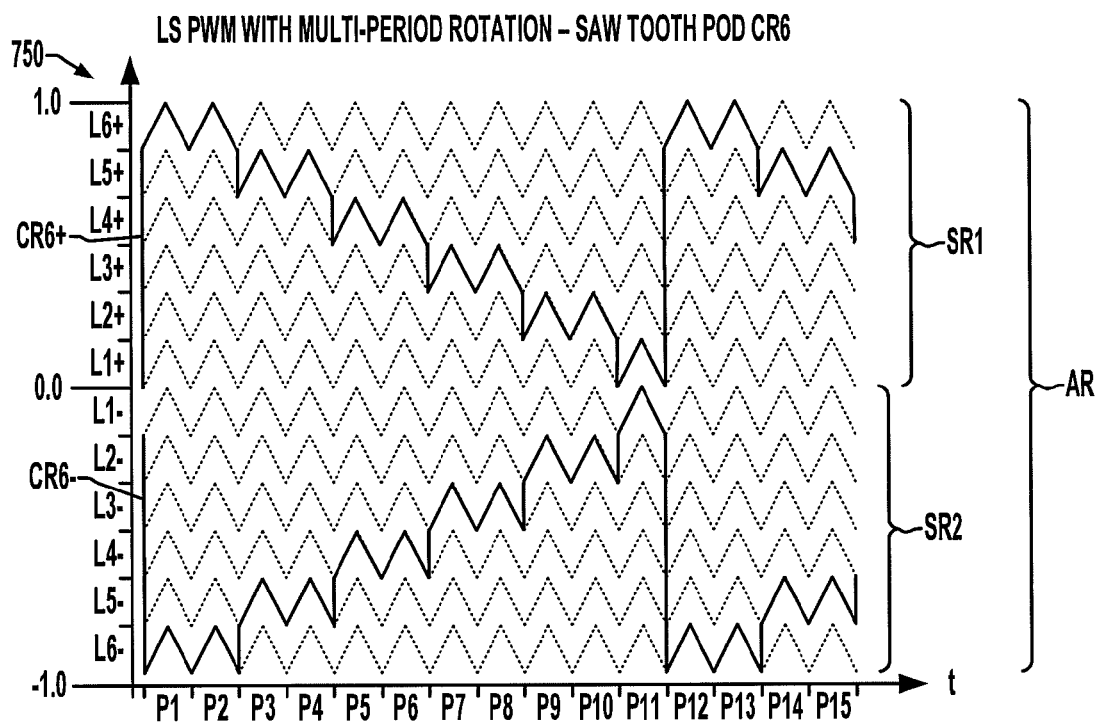
Figure 13A:
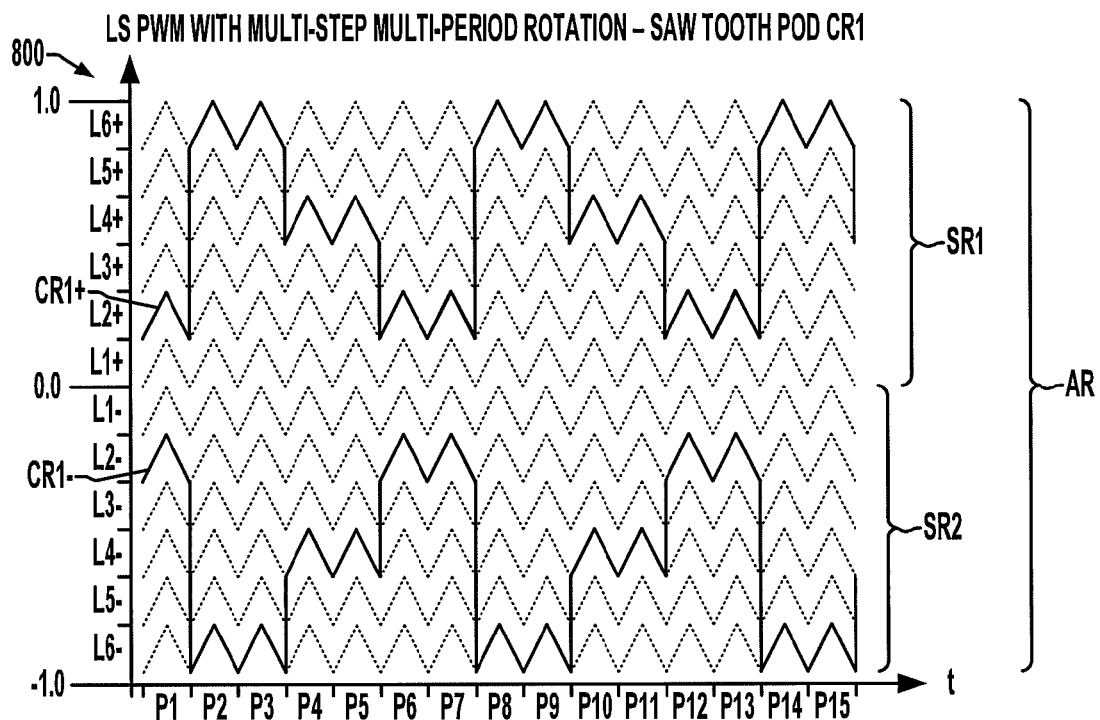
FIGS. 13A-13F are graphs illustrating another exemplary sawtooth POD level shifting pattern for six carrier waveform pairs in which each carrier is shifted by two amplitude levels every two carrier cycles in the inverter of FIG. 1.
Figure 13B:
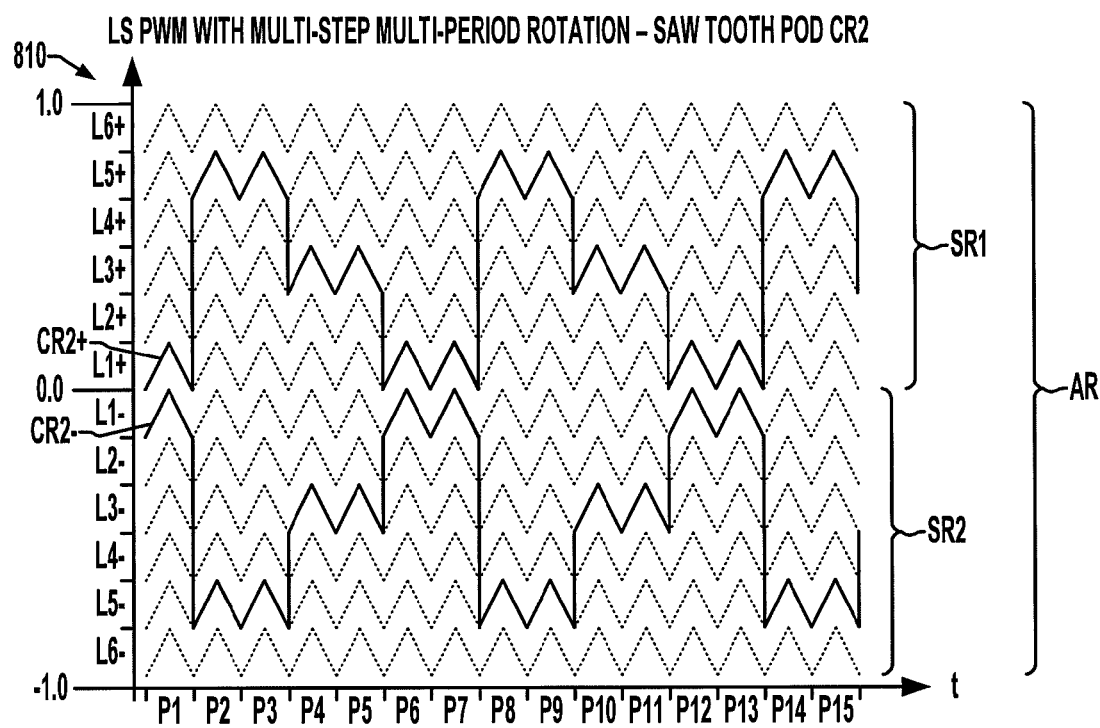
Figure 13C:
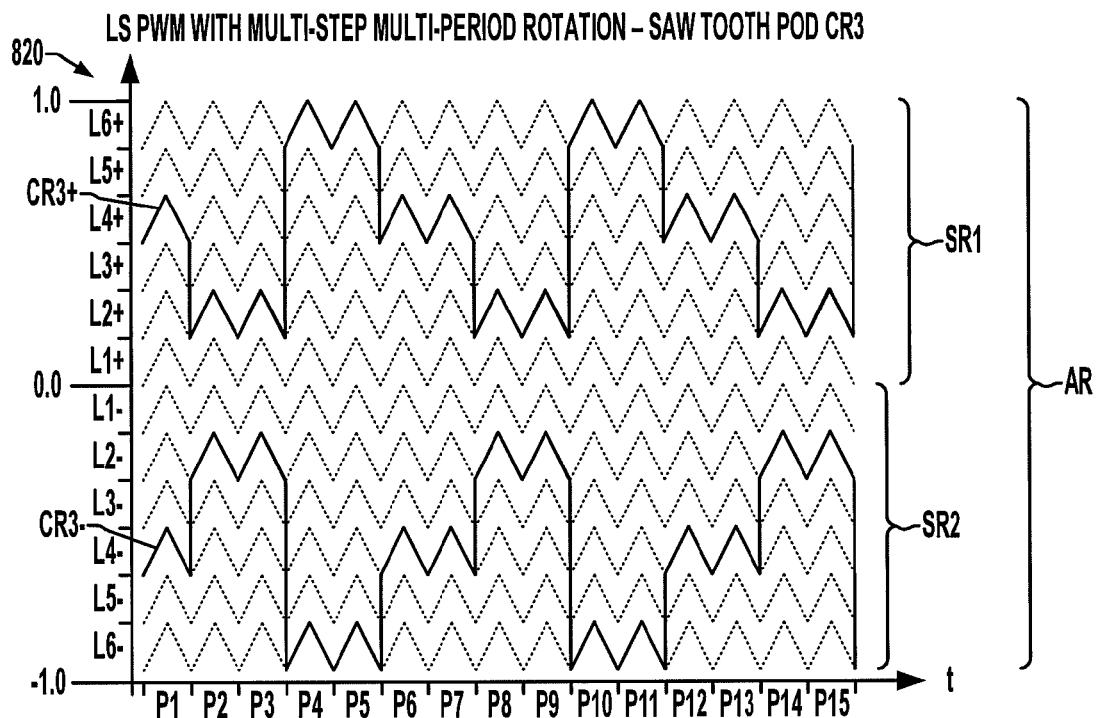
Figure 13D:
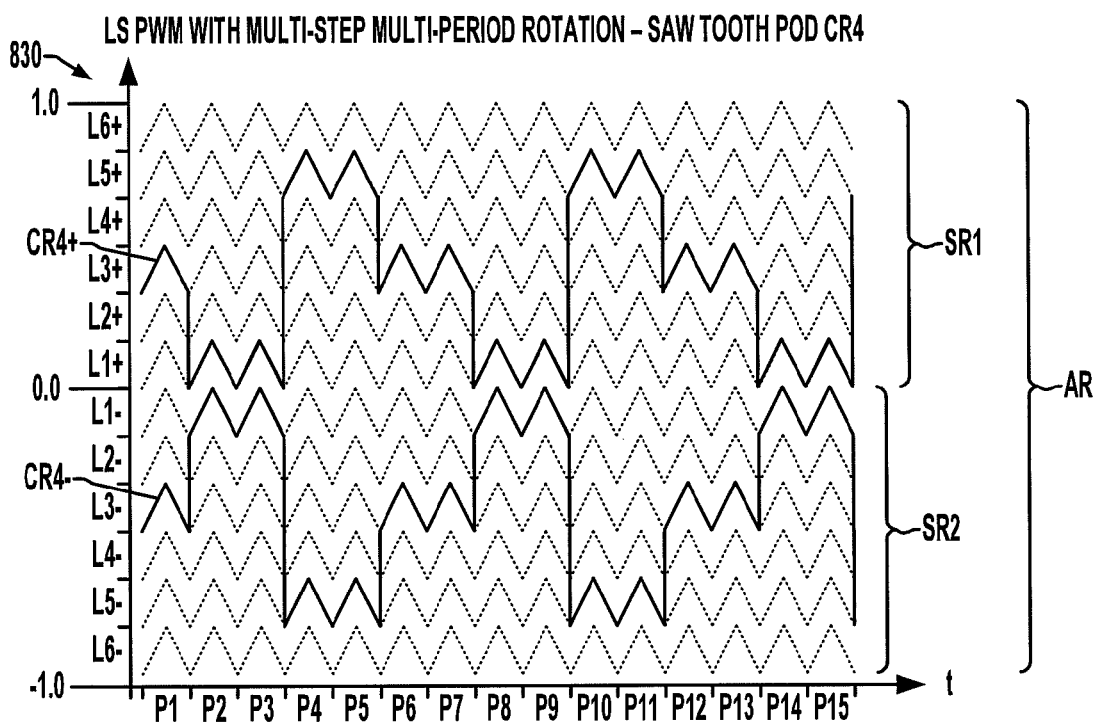
Figure 13E:
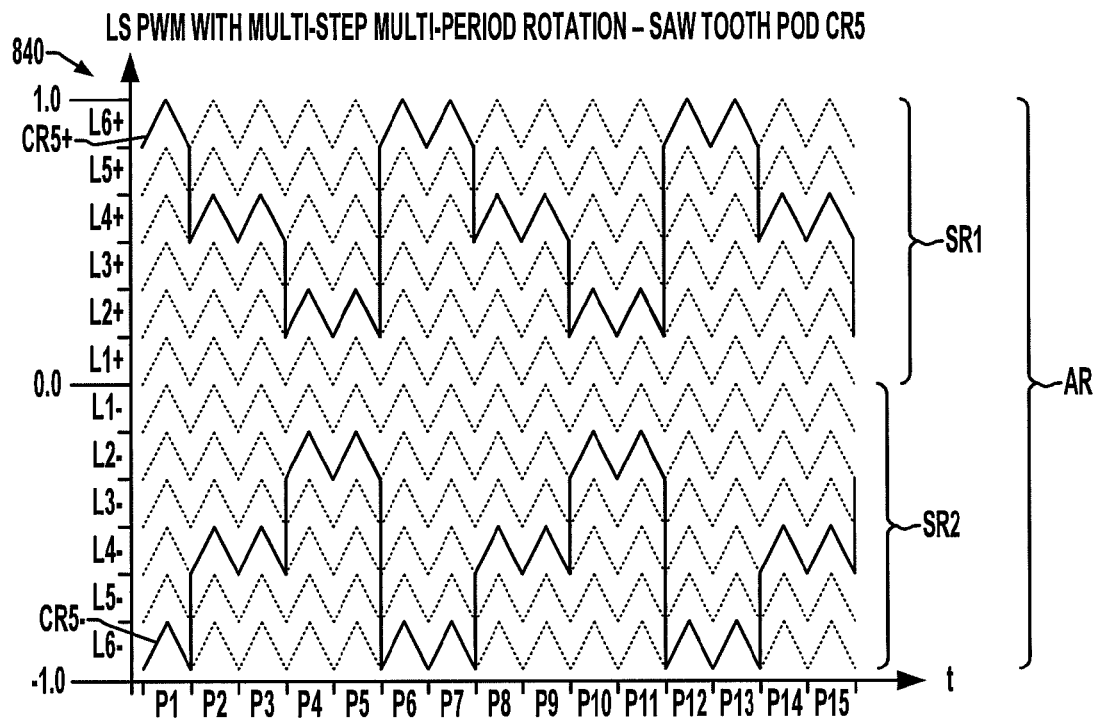
Figure 13F:
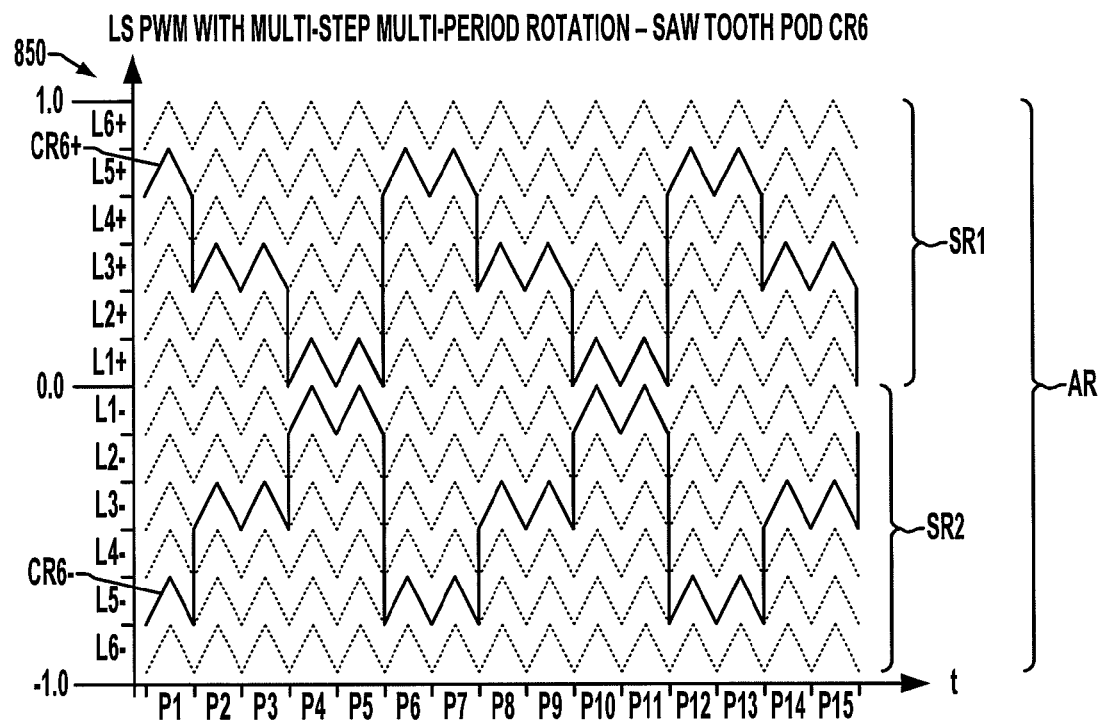

Referring now to FIGS. 8-10, FIG. 8 illustrates a graph 400 showing a triangular POD level shifting pattern embodiment 50 (with dwelling at the circled portions as in the example of FIG. 7 above). In this case, like the example of FIG. 7, the first and second carriers CR1+ and CR1− are both shifted (ramped) up and then shifted (ramped) down in increments of one amplitude level L, with dwelling at the end levels. However, the carriers of each carrier waveform pair 43, 45 in this example are in phase-opposite or phase-opposition disposition relationship to one another (POD). A graph 410 in FIG. 9 shows the pair of carrier waveforms shifted over time according to the triangular POD level shifting pattern 50 of FIG. 8 along with the corresponding voltage reference signal or value 47 in operation of the CHB inverter 40 of FIGS. 1-3. A graph 420 in FIG. 10 illustrates exemplary switching control signals 49 for the switching devices S1 and S3 of the corresponding H-Bridge inverter stage 42 generated using the pair of level shifted of carrier waveforms 43, 45 of FIGS. 8 and 9.

Comparative simulation results indicate that the above level shift PWM techniques using rotating level shifting patterns 50 provides several benefits, particularly compared with phase shift PWM techniques in generating switching control signals for multilevel cascaded H-Bridge inverters. For the above illustrated 13-level system 10, for instance, improved output voltage THD is achieved using these techniques compared with phase shift PWM. For the motor drive 10 at 100% output load, phase shift PWM techniques yield THD of 8% at a speed of 1.0 pu, whereas LS PWM without the rotating patterns yields a THD of 5%. At lower speeds, simulation results at 0.2 pu show a THD for phase shift PWM of 28% and a THD of 20% for level shift PWM without rotation.

In addition, the disclosed techniques also provide significantly improved voltage balance among the power cells as compared with level shift PWM without rotation. Simulation results for the above described 13-level embodiments with a modulation index of 1 show a significant decrease in the DC link voltage of the uppermost and lowermost inverter stages (e.g., 42-U1 and 42-U6 in FIGS. 1 and 3 above) when the triangular POD embodiments (e.g., FIGS. 8-10 above) are used compared with using level shift PWM without rotation.

Thus, the above-described embodiments facilitate the same switching frequency for devices of all the inverter stages 42, whereas level shift PWM without rotation results in different device switching frequencies. In addition, the embodiments facilitate even power distribution between the stages 42, which is a significant drawback for level shift PWM without rotation, and rectifier input current THD at rated speed is improved using the disclosed concepts relative to phase shift PWM and compared with level shift PWM without rotation, and is better than level shift PWM without rotation at 20% of rated speed. Also, simulation results show that rectifier input current lower order harmonics are of very low amplitude using the concepts of the present disclosure, whereas level shift PWM without rotation yields higher 5th and 7th order harmonics. In addition, these techniques provide good output line-line voltage THD at rated speed, and commensurate performance with level shift PWM without rotation at 20% of rated speed (both being better than that of phase shift PWM techniques).

Referring now to FIGS. 11A-13F, in other embodiments, the level shifting may be extended in time, wherein the integer number M is greater than one, and/or the controller 48 can implement level shifting patterns 50 by which the amplitude level L of the individual carrier waveform signals or values 43 and 45 is shifted by at least two amplitude levels L every M waveform periods P. FIGS. 11A-11F illustrate graphs 600, 610, 620, 630, 640 and 650 showing another exemplary sawtooth POD level shifting pattern for the six pairs of carrier waveforms 43, 45. In this embodiment, each carrier 43, 45 is shifted by two amplitude levels every carrier cycle P. FIGS. 12A-12F provide graphs 700, 710, 720, 730, 740 and 750 showing another exemplary sawtooth POD level shifting pattern 50 in which each carrier 43, 45 is shifted by a single amplitude level L every two carrier cycles P. Graphs 800, 810, 820, 830, 840 and 850 in FIGS. 13A-13F illustrate a combination of these two aspects in which a sawtooth POD level shifting pattern 50 shifts each carrier 43, 45 by two amplitude levels L every two carrier cycles P.

Referring now to FIGS. 14-25F, FIG. 14 shows an alternate H-Bridge inverter stage implementation in which an inverter stage 42 is provided with cells with modulation control signals 49 via a controller 48 implementing a complementary or inverse reference sign-triangle modulation approach with a level shift pattern using a pair of complementary (inverse) references and a single carrier in the controller 48.

Figure 14:
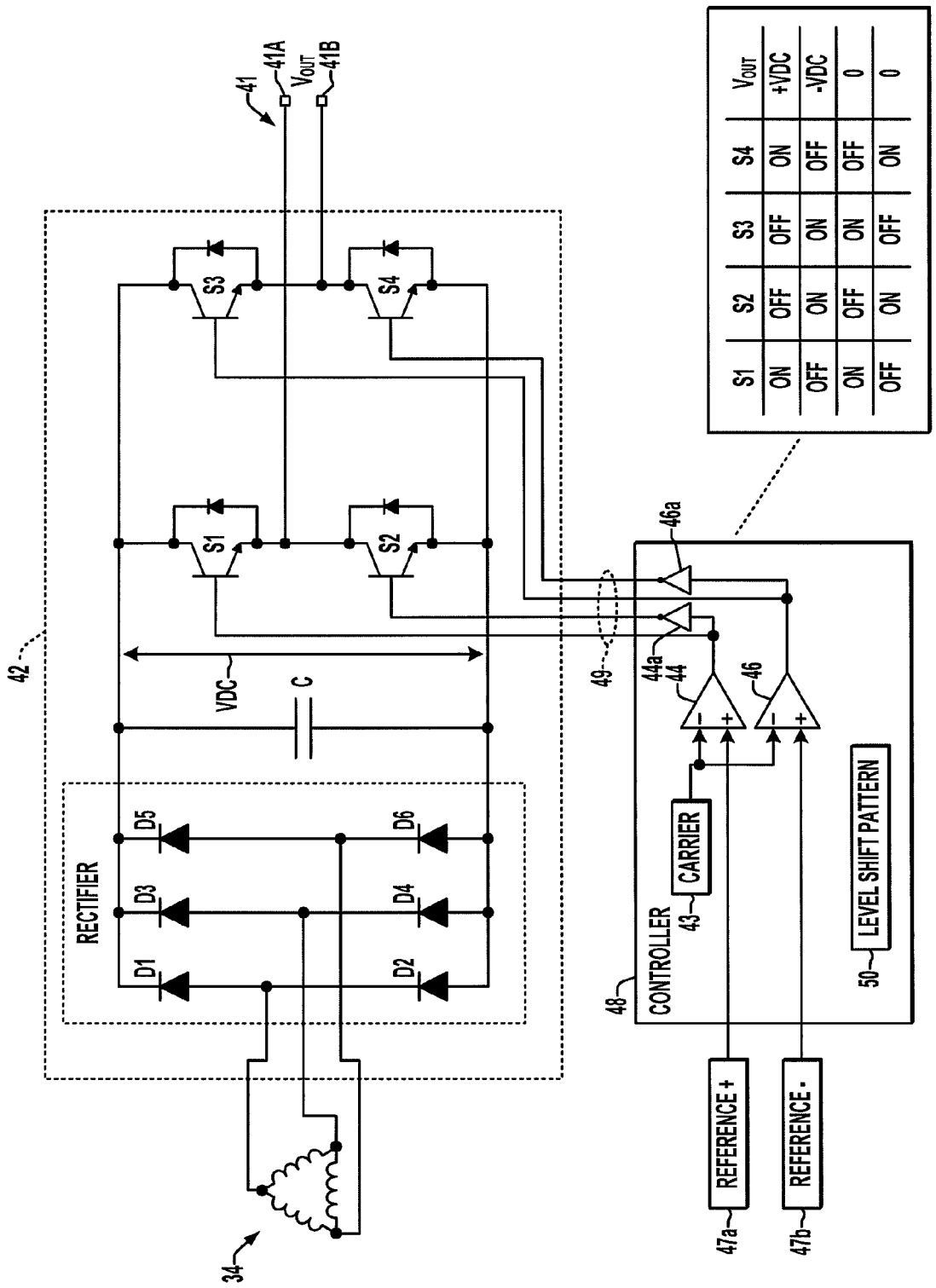
FIG. 14 is a schematic diagram showing an alternate H-Bridge inverter stage implementation with a level shift pattern and comparison circuitry for complementary reference sine-triangle modulation using a pair of complementary (inverse) references and a single carrier in the controller for inverter control signal generation.

FIG. 14 illustrates another implementation of the controller 48 with comparison logic or circuitry 44, 46 for providing switching control signals 49 to a given inverter stage 42, in this case implementing complimentary or inverse reference modulation of a single carrier 43 using a pair of first and second complementary references 47a and 47b, respectively. The carrier 43 for the associated stage 42 may be generated as a voltage signal waveform and/or may be digital waveform values generated numerically using a processor in the controller 48, and defines a periodic carrier waveform with a waveform period P, with the waveform periods of the waveform set being substantially equal in certain embodiments. As with the above described complementary carrier configuration of FIGS. 2-13F, the single carrier waveform 43 for each stage in the embodiments of FIGS. 14-25F is preferably the same shape throughout the set, although this is not a strict requirement of all embodiments. In addition, any suitable waveform shape can be used, such as triangular waveform 43 as illustrated and described further hereinafter, or other shapes such as sawtooth waveforms, sine waves, etc. (not shown). In this implementation, when the positive reference 47a is greater than the carrier 43, the comparator 44 turns on switch S1 and, through inverter 44a, turns off switch S2 of the inverter stage 42, and when the reference 47a goes below the carrier 43, comparator 44 turns off S1 and turns on S2. Switch S3 is turned on and S4 is turned off through inverter 46a when the inverse reference 47b goes above the carrier 43. Per the table in FIG. 14 the inverter stage output attempts to decrease the voltage applied to the corresponding motor phase when S2 and S3 are on and increases the voltage applied to the corresponding motor phase when S1 and S4 are on. The controller 48 in this embodiment implements similar comparison schemes corresponding to each of the series-connected inverter stages 42 as seen in FIG. 15 to cause the corresponding output voltage for each of the motor phases U, V and W to track their respective reference signals or values 47.

Figure 19:
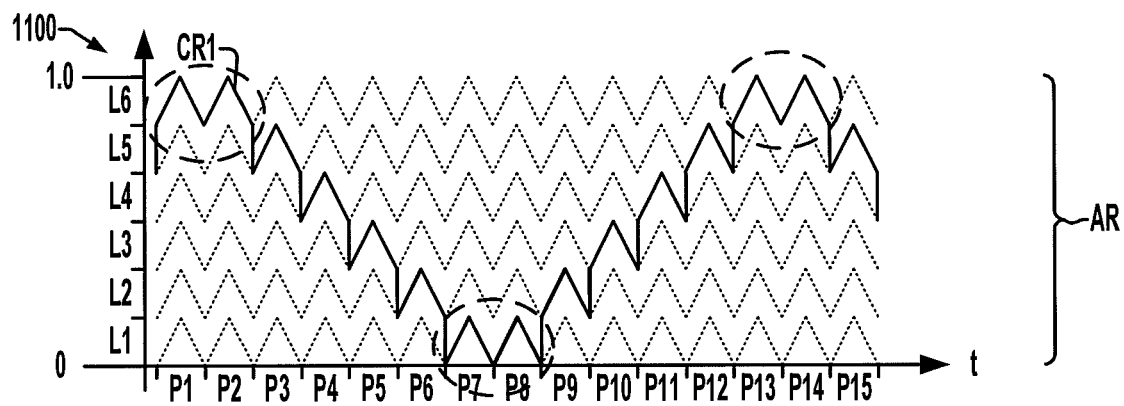
FIG. 19 is a graph illustrating exemplary triangular level shifting pattern for one exemplary carrier waveform using complementary reference sine-triangle modulation in the CHB inverter of FIG. 1.
Figure 20:
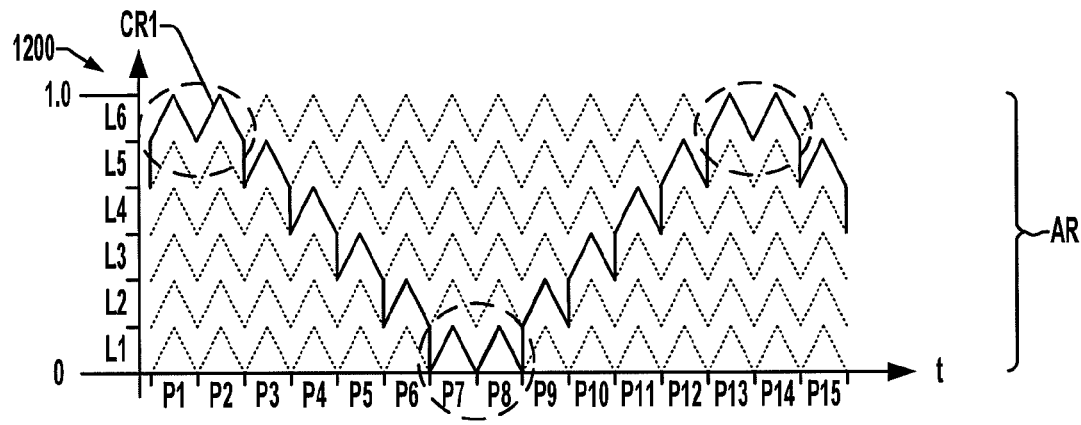
FIG. 20 is a graph illustrating an exemplary triangular level shifting pattern for one exemplary carrier waveform for complementary reference sine-triangle modulation in the inverter of FIG. 1.

As seen in FIGS. 16 and 17A-17F, the controller 48 generates the switching control signals 49 for the inverter stages 42 of the inverter 40 according to an exemplary process 90 (FIG. 16), in which the amplitude levels L of at least two of the carrier waveforms 43 are shifted every integer number M waveform periods P according to a shifting pattern 50, where the patterns 50 may optionally include dwell periods for one or more carrier cycles before shifting resumes in a repeating overall pattern, referred to herein as shifting amplitude levels every M waveform periods (e.g., FIGS. 19 and 20 below). Each new carrier period P begins at 91 in FIG. 16, where a set of N (e.g., 6 in the illustrated example) carrier waveforms (signals or values or combinations thereof) are generated at 92 including a single carrier waveform 43 for each inverter stage 42, with each carrier waveform 43 set to a different amplitude level L in each carrier waveform period P.

Figure 15:
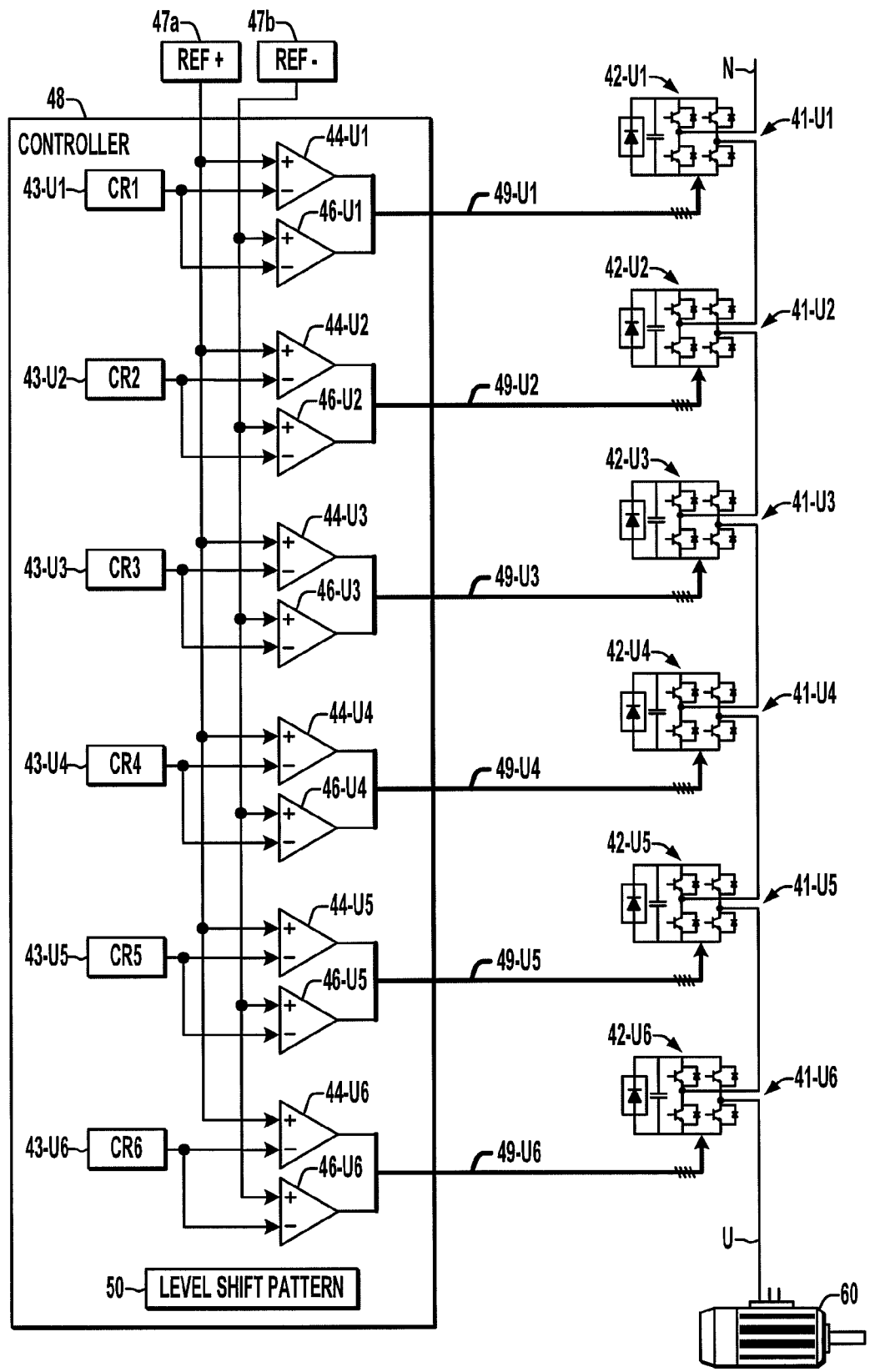
FIG. 15 is a schematic diagram illustrating carrier waveform comparison circuitry or logic for six cascaded H-Bridge inverter stages to drive one phase of a three-phase motor in the power converter of FIG. 1 using complementary references and a single carrier for each stage.

Examples of sawtooth level shifting patterns are shown in graphs 900, 910, 920, 930, 940 and 950 in FIGS. 17A-17F for six carrier waveforms, including CR1 (FIG. 17A; 43-U1 in FIG. 15) provided to the comparators 44-U1 & 46-U1 for creating switching control signals 49-U1 for operating the first cascaded inverter stage 42-U1 for motor phase U of the 13-level CHB inverter of FIG. 15. Similarly, FIGS. 17B-17F show the rest of the carrier waveform set including CR2-CR6 for generating switching control signals 49-U6 to operate the inverter stages 42-U1 through 42-U6, wherein each carrier is at a different amplitude level L. The amplitude levels of the carrier set 43 are each within an expected amplitude range AR of the references 47a and 47b, and the levels L1-L6 are non-overlapping, and preferably cover each possible amplitude level within the range AR to ensure that a carrier 43 is provided in each of the levels L during each carrier period P, although not strict requirements of all embodiments of the present disclosure.

Figure 16:
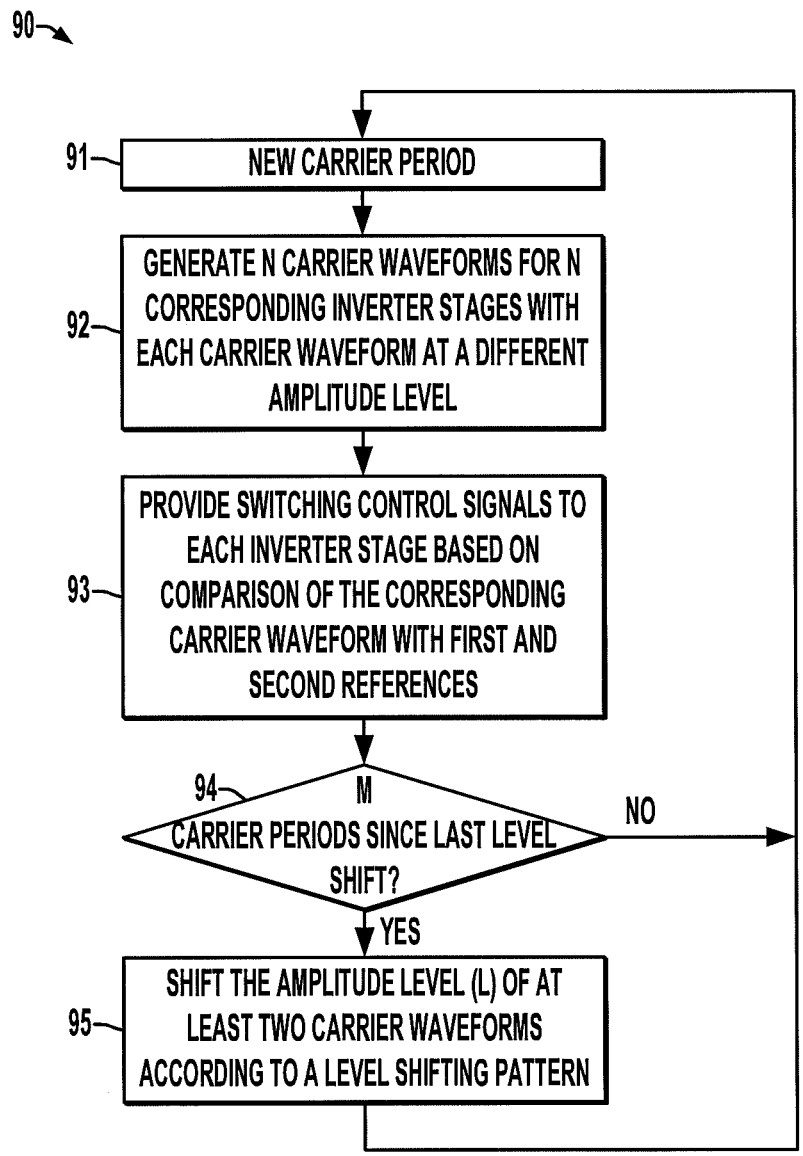
FIG. 16 is a flow diagram illustrating an exemplary method for generating multilevel inverter switching control signals using complementary references and a single carrier for each inverter stage in accordance with further aspects of the disclosure.
Figure 17A:
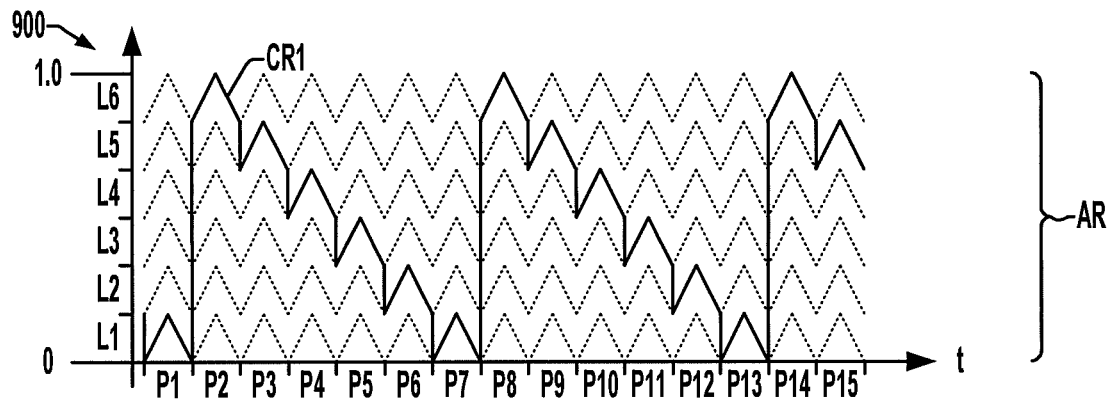
FIGS. 17A-17F are graphs illustrating an exemplary sawtooth level shifting pattern for six carrier waveforms in one phase of the CHB inverter of FIG. 1 using complementary reference sine-triangle modulation in the power converter of FIG. 1.
Figure 17B:
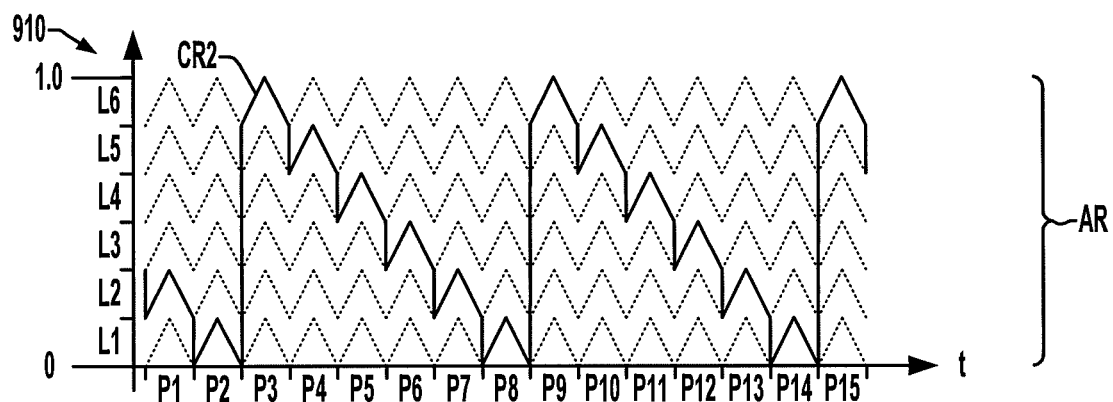
Figure 17C:
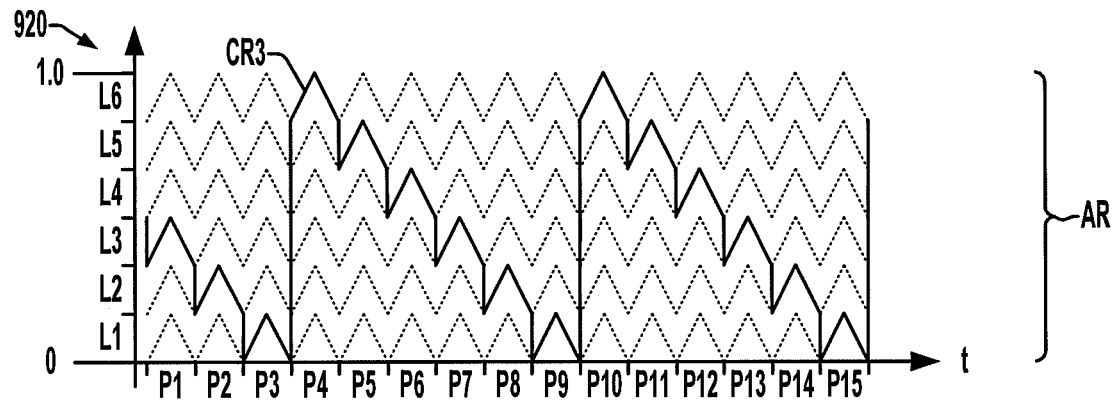
Figure 17D:
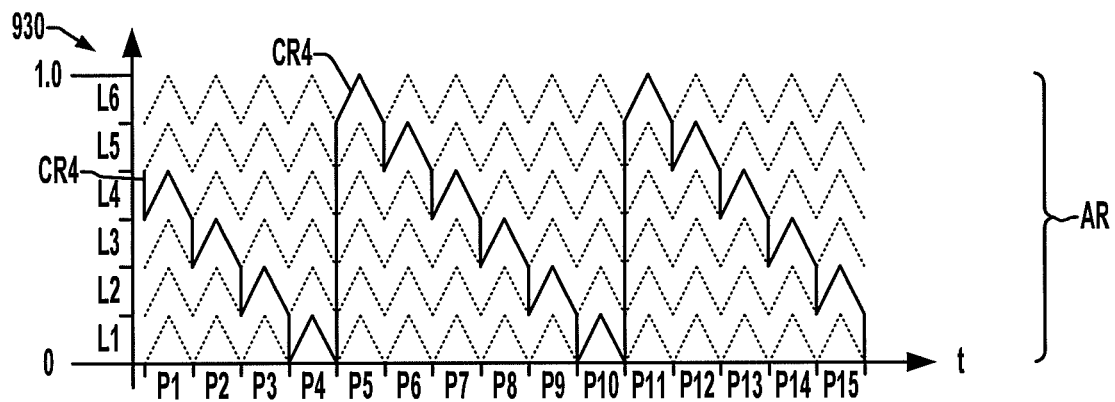
Figure 17E:
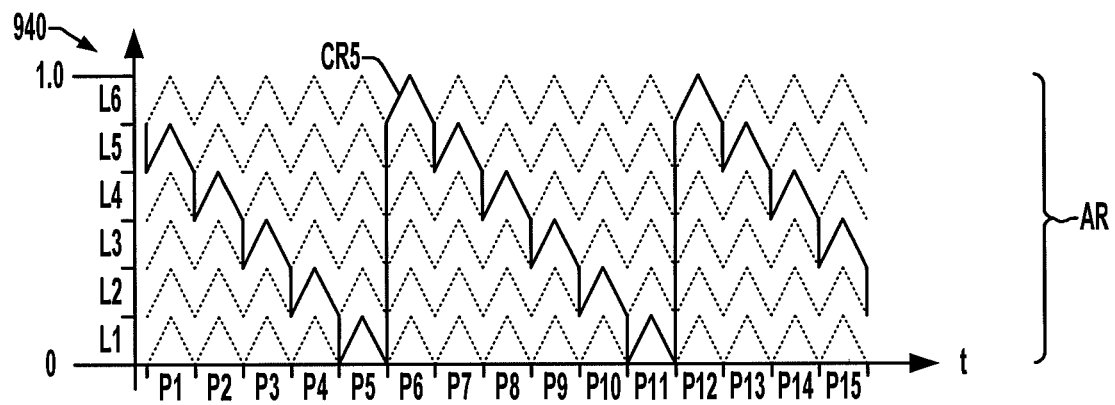
Figure 17F:
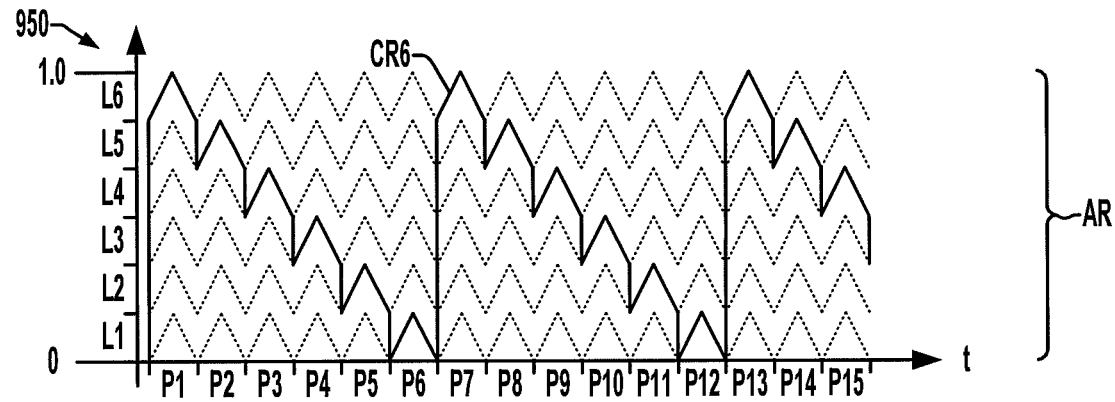

At 93 in FIG. 16, the controller 48 provides switching control signals 49 using the carriers 43 generated for each inverter stage 42, where the signals 49 for a given inverter stage 42 are based on comparison of the corresponding carrier waveform signal or value 43 with the first and second reference signals or values 47a and 47b for the corresponding motor phase, for example as described above using hardware and/or processor-executed firmware/software to implement the functionality of the comparators 44, 46 shown in FIGS. 14 and 15. A determination is made at 94 in FIG. 16 as to whether shifting is to be done for the next carrier cycle (e.g., whether an integer number M carrier cycles have occurred since the last level shift, where M is greater than zero). If not (NO at 94), the controller generates carrier waveforms and switching control signals for the next carrier cycle or period at 92 and 93 as described above. Otherwise (YES at 94), the controller 48 shifts the amplitude level L of at least two of the carrier waveform signals or values 43 for the next carrier waveform period P at 95 according to the repeating level shifting pattern 50. Other embodiments are possible (e.g., see FIGS. 19 and 20 below) in which dwelling is used at one or more points in a given rotation pattern 50.

Figure 18:
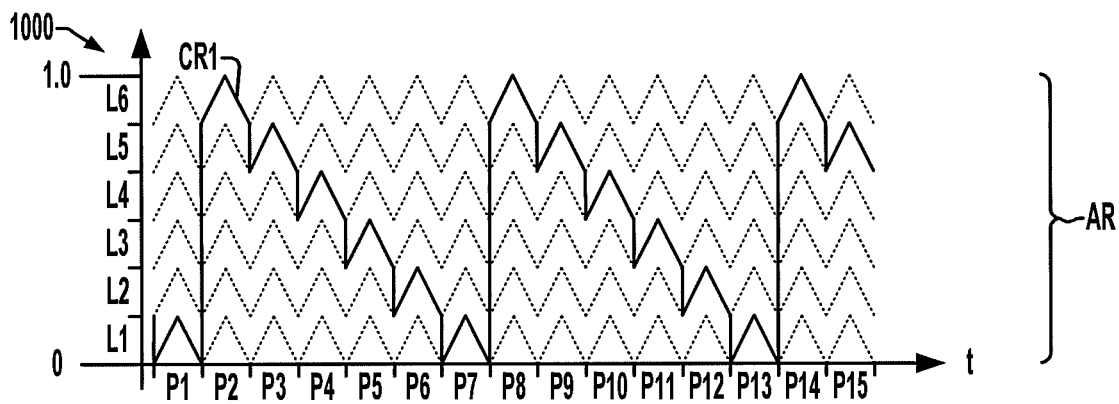
FIG. 18 is a graph illustrating an exemplary sawtooth level shifting pattern for one exemplary carrier waveform using complementary reference sine-triangle modulation in the CHB inverter of FIG. 1.

FIG. 18 shows a graph 1000 illustrating an exemplary sawtooth level shifting pattern for one exemplary carrier waveform CR1, and similar shifted amplitude level waveform patterns are provided in this implementation for the other carrier waveforms (not shown) with the amplitude levels being offset from one another such that each amplitude level L is occupied in each of the cycles P of the carrier waveforms 43. In this case, the amplitude level L is shifted for each carrier 43 in each succeeding waveform period P by one incremental level, with CR1 being positioned at amplitude level L1 in the first cycle P1 and is thereafter shifted by the controller 48 to positions L6, L5, L4, L3 and L2 in the successive periods P2, P3, P4, P5 and P6, respectively, after which the pattern repeats.

FIG. 19 shows another example in a graph 1100, which provides a triangular pattern through successive shifting of the carrier waveform 43 in every period P with dwelling. In this case CR1 is at level L6 during the first and second illustrated carrier cycles P1 and P2. From there, CR1 is subsequently shifted to positions L5 at P3, L4 at P4, L3 at P5, L2 at P6, and remains at level L1 for the carrier periods P7 and P8. Thereafter, the triangular pattern in FIG. 19 shifts CR1 upward through the levels L2 at cycle P9, L3 at P10, L4 and P11, and L5 at P12, and then remains at the top level L6 for two cycles P13 and P14. As seen in this example, the carrier is shifted downward one level L in successive cycles P (e.g., P2 through P7) and then reverses direction with the shifting being upward by one level L each period P (P8 through P13). Thus, the level shifting pattern 50 in FIG. 19 is triangular. CR1 remains at the end levels L6 and L1 for two consecutive cycles (P1 & P2; P7 & P8; P 13 & P14; etc.) as the pattern repeats, and during such dwelling periods (circled in dashed line in the figure), at least two of the other carriers of the set are shifted accordingly such that all levels L are occupied by one of the carrier waveforms 43 during each of the cycles P. In other triangular pattern embodiments, the carrier CR1 may remain at one or more different levels L for more than one waveform period P. Furthermore, still other embodiments are possible in which no dwelling is done for any of the carriers 43.

Figure 21:
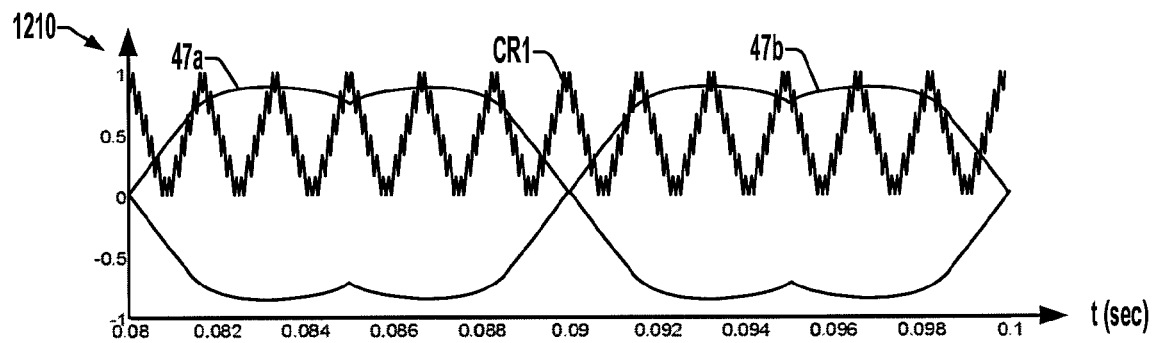
FIG. 21 is a graph illustrating the carrier waveform shifted according to the triangular level shifting pattern of FIG. 20 along with a corresponding complimentary pair of voltage reference signals or values for complementary reference sine-triangle modulation in the inverter of FIG. 1.
Figure 22:
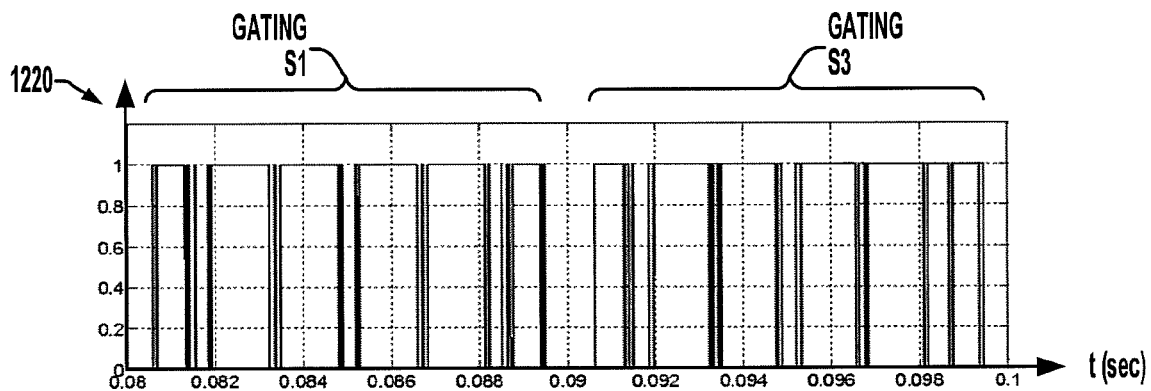
FIG. 22 is a graph illustrating exemplary switching control signals for switching devices of the H-Bridge inverter stage generated using the level shifted carrier waveform of FIGS. 20 and 21.
Figure 23A:
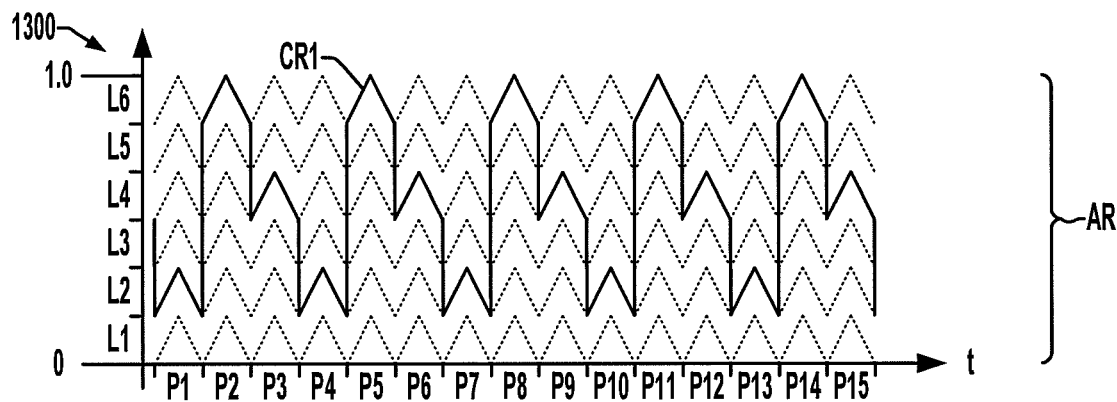
FIGS. 23A-23F are graphs illustrating another exemplary sawtooth level shifting pattern for six carrier waveforms in which each carrier is shifted by two amplitude levels every carrier cycle for complementary reference sine-triangle modulation in the inverter of FIG. 1.
Figure 23B:
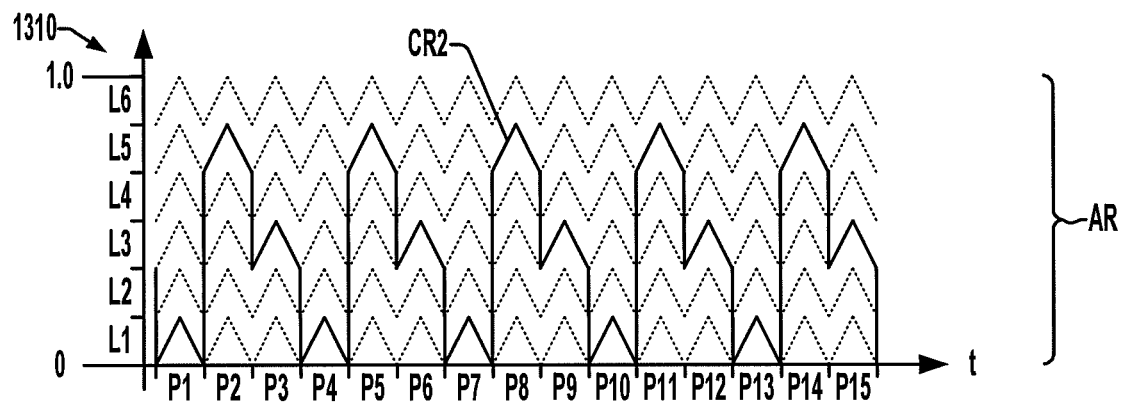
Figure 23C:
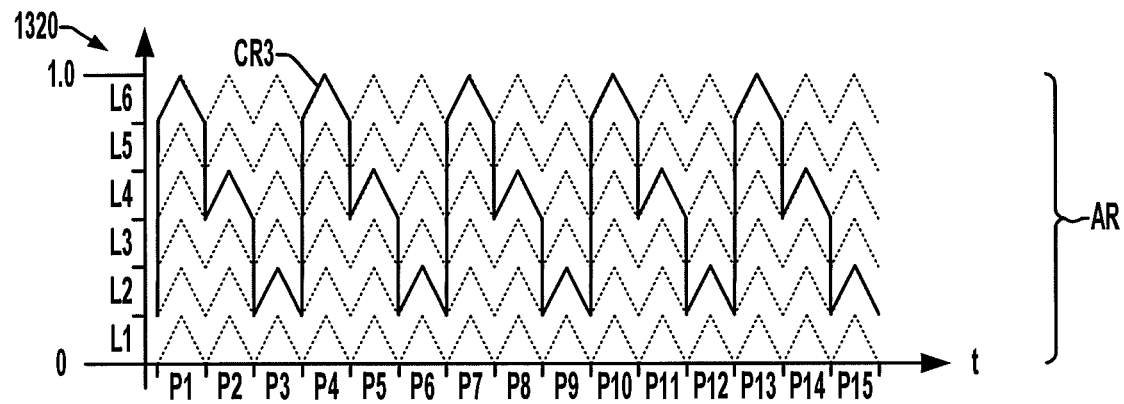
Figure 23D:
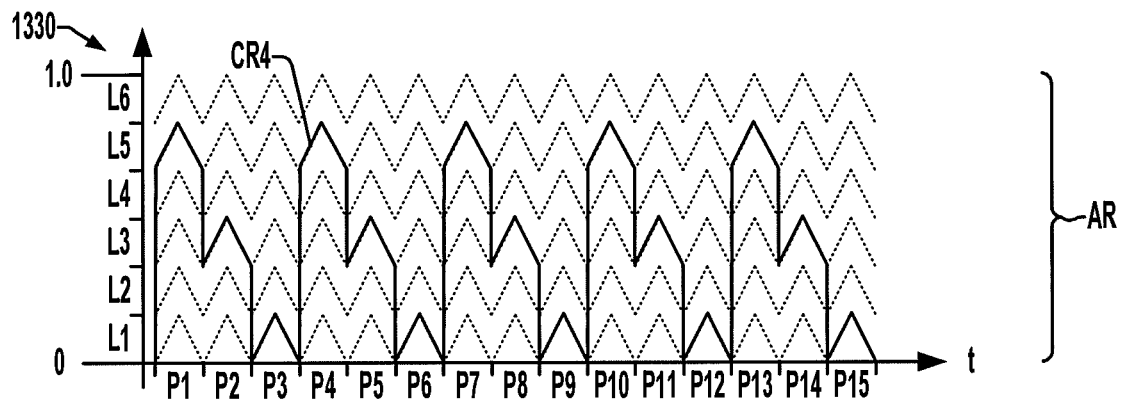
Figure 23E:
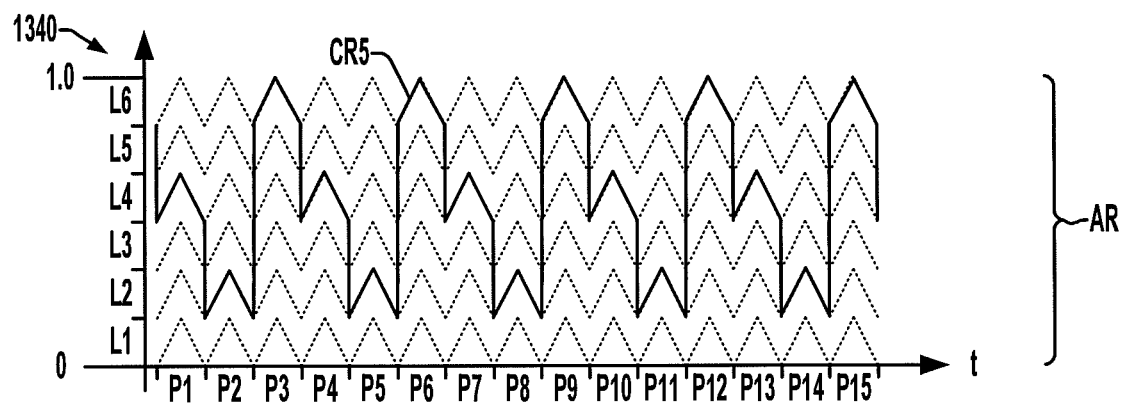
Figure 23F:
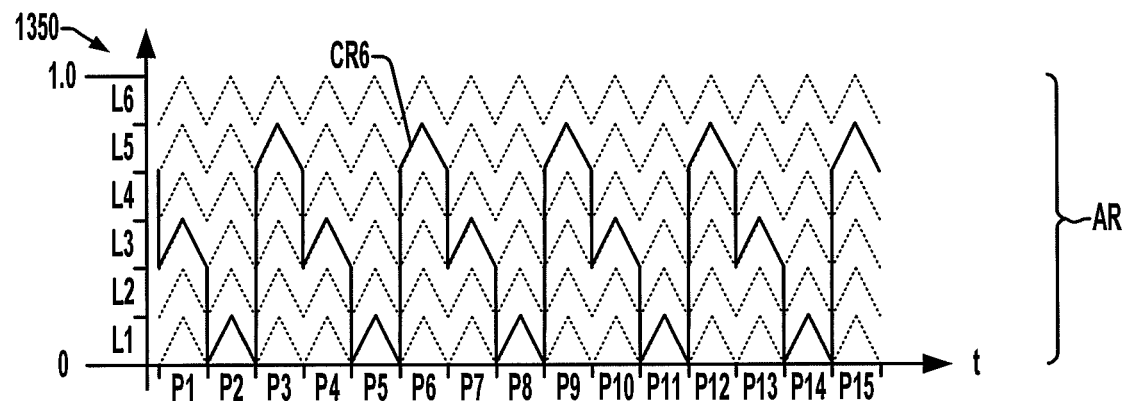
Figure 24A:
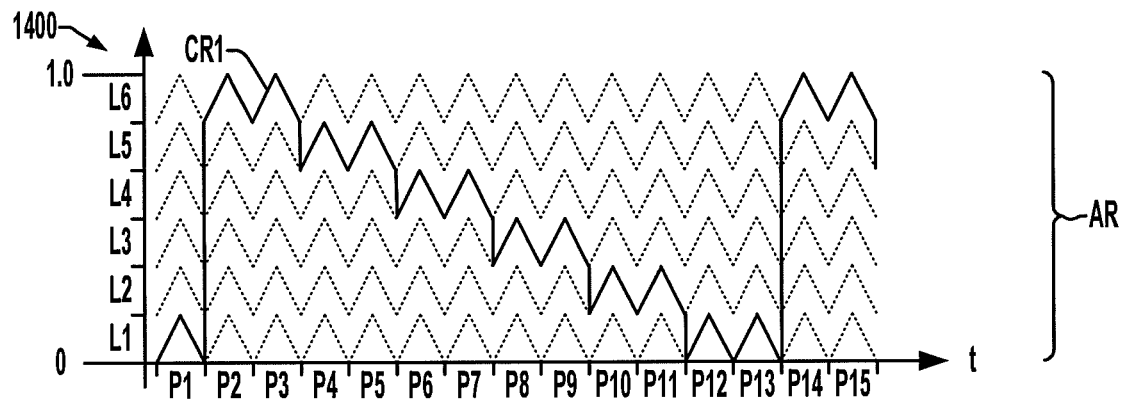
FIGS. 24A-24F are graphs illustrating yet another exemplary sawtooth level shifting pattern for six carrier waveforms in which each carrier is shifted by a single amplitude level every two carrier cycles for complementary reference sine-triangle modulation in the inverter of FIG. 1.
Figure 24B:
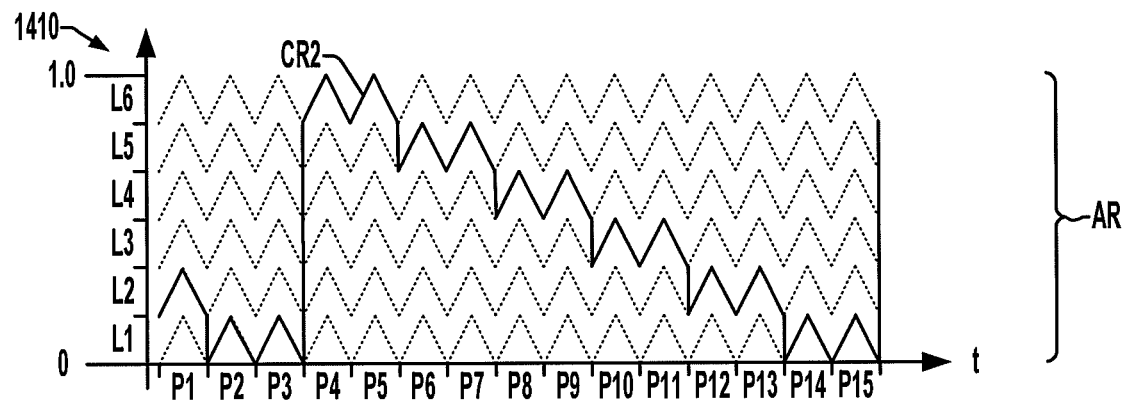
Figure 24C:
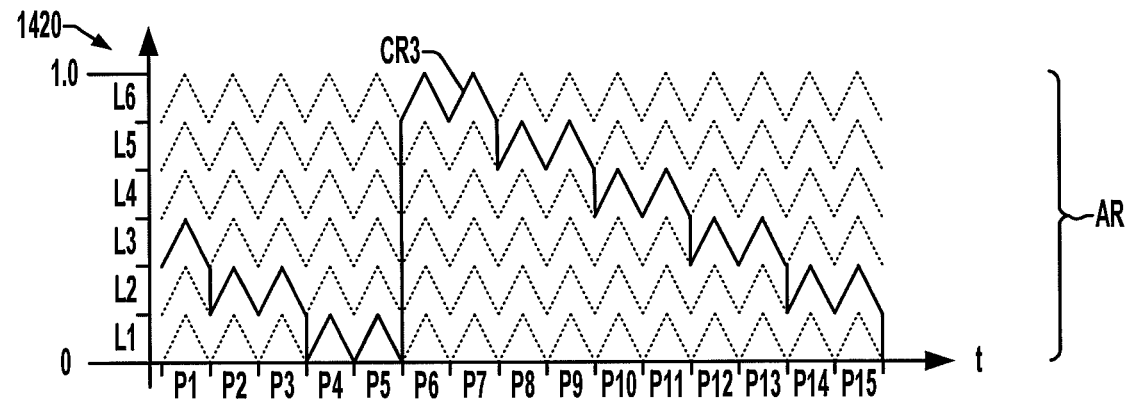
Figure 24D:
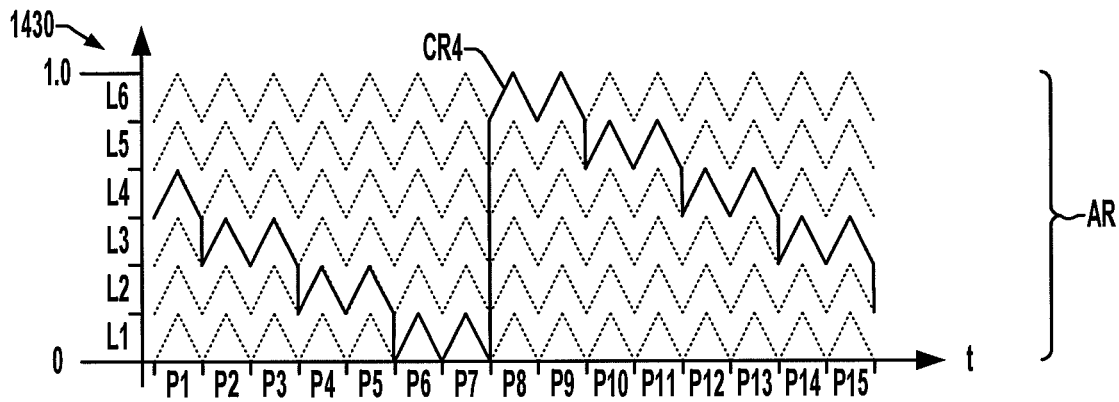
Figure 24E:
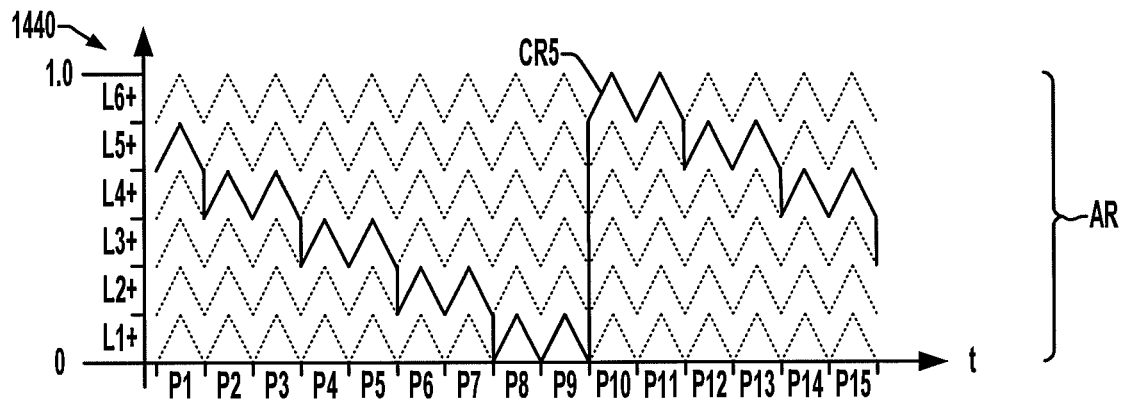
Figure 24F:
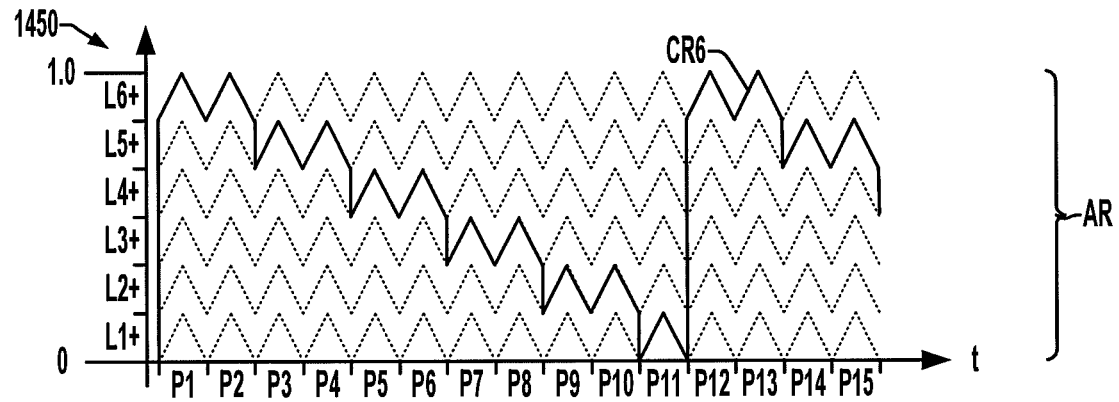
Figure 25A:
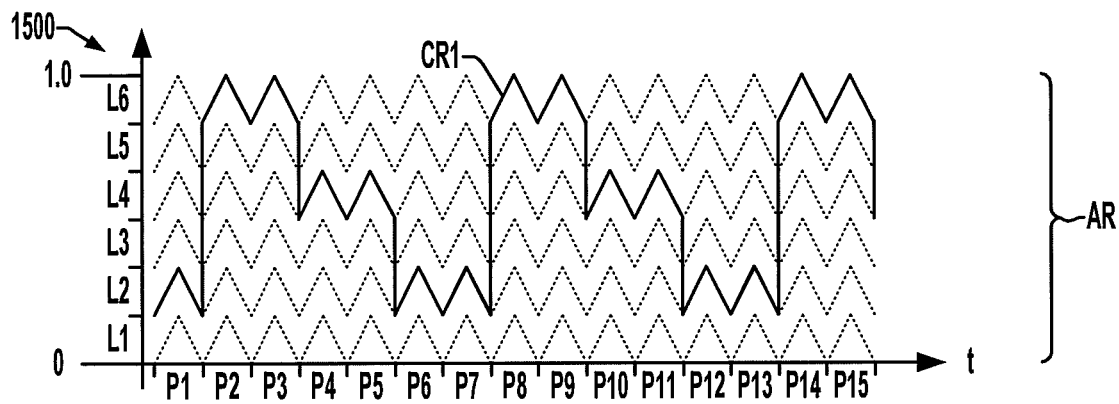
FIGS. 25A-25F are graphs illustrating another exemplary sawtooth level shifting pattern for six carrier waveforms in which each carrier is shifted by two amplitude levels every two carrier cycles for complementary reference sine-triangle modulation in the inverter of FIG. 1.
Figure 25B:
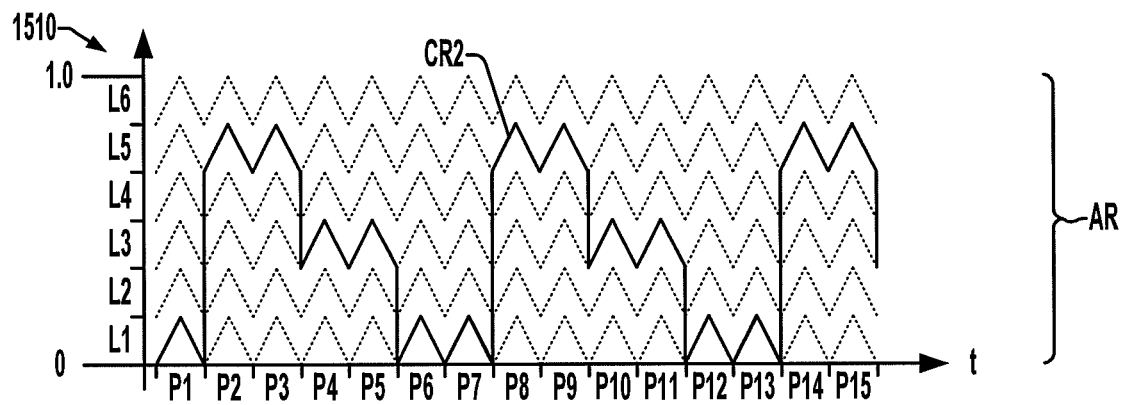
Figure 25C:
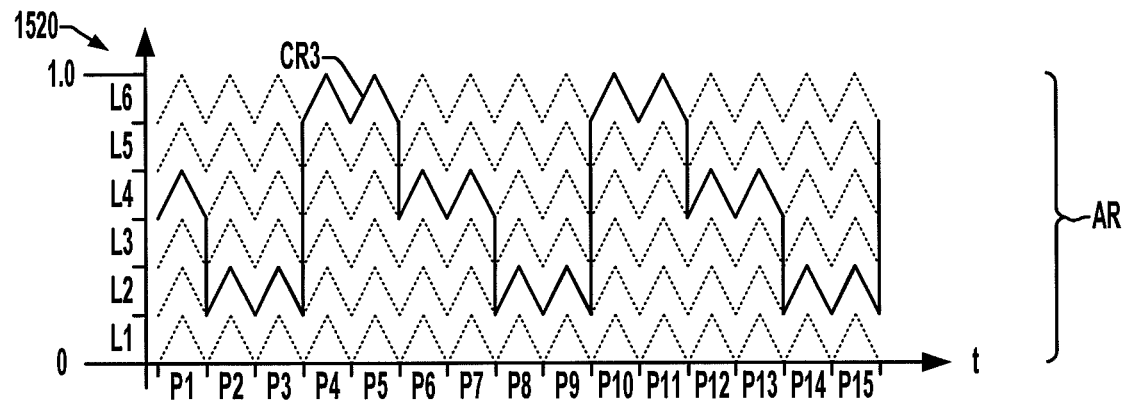
Figure 25D:
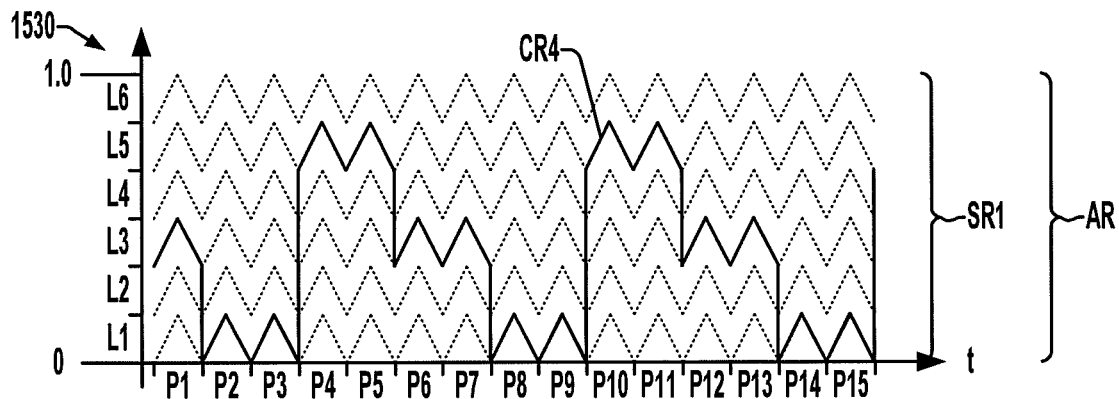
Figure 25E:
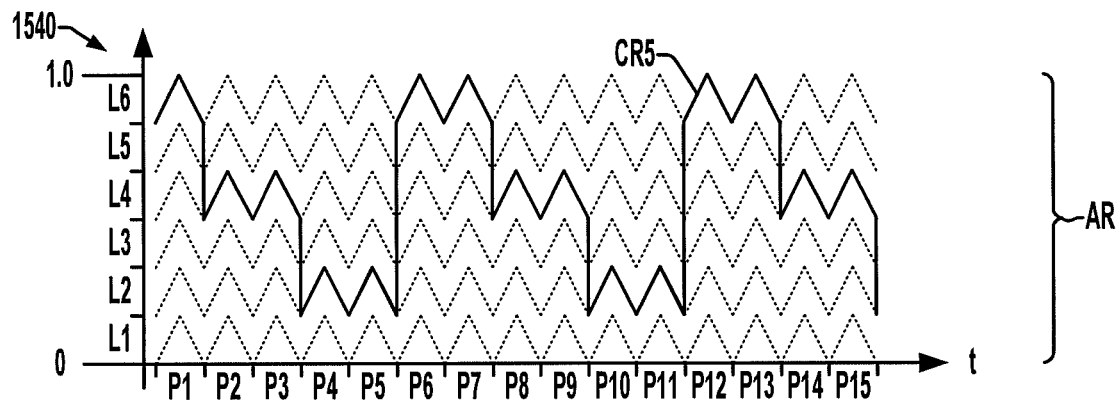
Figure 25F:
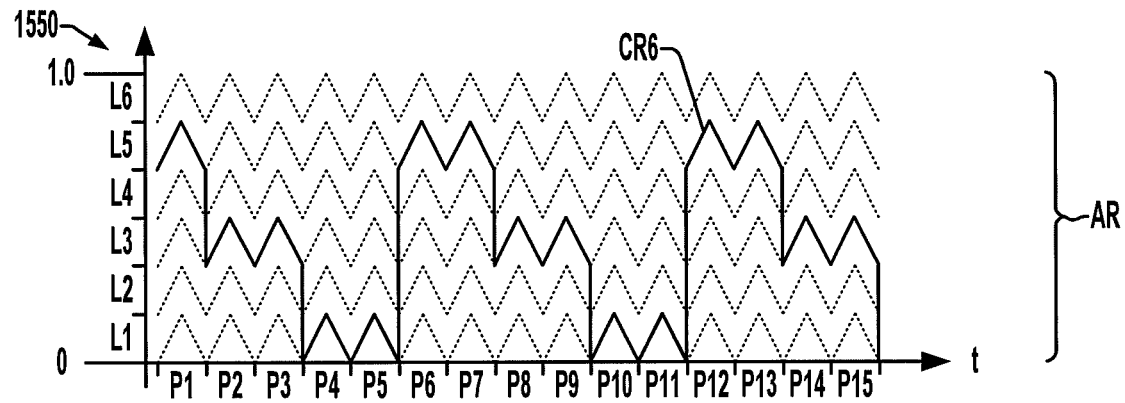

Graph 1200 in FIG. 20 illustrates a triangular level shifting pattern embodiment with dwelling at the circled portions, in which the carrier CR1 is shifted (ramped) up and then shifted (ramped) down in increments of one amplitude level L, with dwelling at the end levels. A graph 1210 in FIG. 21 shows the carrier CR1 shifted over time according to the triangular pattern 50 of FIG. 20 along with the corresponding voltage reference signals or values 47a and 47b in operation. A graph 1220 in FIG. 22 illustrates exemplary switching control signals 49 for the switching devices S1 and S3 of the corresponding H-Bridge inverter stage 42 generated using the level shifted carrier 43 of FIGS. 20 and 21. As with the dual carrier examples in FIGS. 2-13F above, the complementary or inverse reference examples using rotating level shifting patterns 50 provides several benefits over phase shift PWM techniques, for instance, improved output voltage THD, and improved voltage balance among the power cells in a given stage.

FIGS. 23A-25F show further non-limiting embodiments in which level shifting may be extended in time, wherein the integer number M is greater than one, and/or the controller 48 can implement level shifting patterns 50 by which the amplitude level L of the individual carrier waveform signals or values 43 is shifted by at least two amplitude levels L every M waveform periods P. FIGS. 23A-23F illustrate graphs 1300, 1310, 1320, 1330, 1340 and 1350 showing another exemplary sawtooth level shifting pattern for the six carrier waveforms 43, in which each carrier 43 is shifted by two amplitude levels every carrier cycle P. FIGS. 24A-24F provide graphs 1400, 1410, 1420, 1430, 1440 and 1450 showing another exemplary sawtooth level shifting pattern 50 in which each carrier 43 is shifted by a single amplitude level L every two carrier cycles P. In addition, graphs 1500, 1510, 1520, 1530, 1540 and 1550 in FIGS. 25A-25F illustrate a combination of these two aspects in which a sawtooth level shifting pattern 50 shifts each carrier 43 by two amplitude levels L every two carrier cycles P.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
    a multilevel inverter, comprising an integer number N inverter stages, N being greater than three, the inverter stages individually comprising an output, and a switching circuit including a plurality of switching devices coupled between a corresponding DC voltage source and the output, the switching circuit operative to provide an output voltage having an amplitude of one of at least two discrete levels at the output according to a plurality of switching control signals, the outputs of the inverter stages being coupled in series; and
    a controller operative to generate a set of N carrier waveform signals or values including a single carrier waveform signal or value for each of the inverter stages, the carrier waveform signals or values individually defining a periodic carrier waveform with a waveform period, the waveform periods of the set of carrier waveform signals or values being substantially equal;
    the controller being operative to set each carrier waveform signal or value at a different one of a plurality of non-overlapping amplitude levels within an expected amplitude range of first and second complementary reference signals or values;
    the controller being operative to provide the switching control signals to the multilevel inverter with the switching control signals provided to a given inverter stage based on comparison of the carrier waveform signal or value for the given inverter stage with the first and second reference signals or values; and
    the controller being operative to shift the amplitude level of at least two of the carrier waveform signals or values every integer number M waveform periods, M being greater than zero.

2. The power conversion system of claim 1, wherein the carrier waveform signals or values individually define a periodic triangular carrier waveform repeating each waveform period.

3. The power conversion system of claim 1, wherein the controller is operative to shift the amplitude level of all the carrier waveform signals or values every M waveform periods according to the level shifting pattern.

4. The power conversion system of claim 3, wherein M is greater than one.

5. The power conversion system of claim 3, wherein the controller is operative to shift the amplitude level of the individual carrier waveform signals or values by at least two amplitude levels every M waveform periods according to the level shifting pattern.

6. The power conversion system of claim 1, wherein M is greater than one.

7. The power conversion system of claim 6, wherein the controller is operative to shift the amplitude level of the individual carrier waveform signals or values by at least two amplitude levels every M waveform periods according to the level shifting pattern.

8. The power conversion system of claim 1, wherein the controller is operative to shift the amplitude level of the individual carrier waveform signals or values by at least two amplitude levels every M waveform periods according to the level shifting pattern.

9. The power conversion system of claim 1, wherein the inverter stages are H-bridge stages individually comprising four switching devices coupled between the corresponding DC voltage source and the corresponding output, the inverter stages individually operative to provide an output voltage having an amplitude of one of at least two discrete levels at the output according to the corresponding switching control signals from the controller.

10. A method for generating switching control signals for an integer number N inverter stages of a multilevel inverter, N being greater than three, the method comprising:

generating a set of N carrier waveform signals or values including a single carrier waveform signal or value for each of the inverter stages, the carrier waveform signals or values individually defining a periodic carrier waveform with a waveform period, the waveform periods of the set of carrier waveform signals or values being substantially equal, and each carrier waveform signal or value being at a different one of a plurality of non-overlapping amplitude levels within an expected amplitude range of first and second complementary reference signals or values;

providing switching control signals to the multilevel inverter with the switching control signals provided to a given inverter stage based on comparison of the carrier waveform signal or value for the given inverter stage with the first and second reference signals or values; and shifting the amplitude level of at least two of the carrier waveform signals or values every integer number M waveform periods, M being greater than zero.

11. The method of claim 10, comprising shifting the amplitude level of all the carrier waveform signals or values every M waveform periods according to the level shifting pattern.

12. The method of claim 11, wherein M is greater than one.

13. The method of claim 12, comprising shifting the amplitude level of the individual carrier waveform signals or values by at least two amplitude levels every M waveform periods according to the level shifting pattern.

14. The method of claim 11, comprising shifting the amplitude level of the individual carrier waveform signals or values by at least two amplitude levels every M waveform periods according to the level shifting pattern.

15. The method of claim 10, wherein M is greater than one.

16. The method of claim 15, comprising shifting the amplitude level of the individual carrier waveform signals or values by at least two amplitude levels every M waveform periods according to the level shifting pattern.

17. The method of claim 14, comprising shifting the amplitude level of the individual carrier waveform signals or values by at least two amplitude levels every M waveform periods according to the level shifting pattern.

18. A non-transitory computer readable medium with computer executable instructions for generating switching control signals for an integer number N inverter stages of a multilevel inverter, N being greater than three, the computer readable medium comprising computer executable instructions for:

generating a set of N carrier waveform signals or values including a single carrier waveform signal or value for each of the inverter stages, the carrier waveform signals or values individually defining a periodic carrier waveform with a waveform period, the waveform periods of the set of carrier waveform signals or values being substantially equal, and each carrier waveform signal or value being at a different one of a plurality of non-overlapping amplitude levels within an expected amplitude range of first and second complementary reference signals or values;

providing switching control signals to the multilevel inverter with the switching control signals provided to a given inverter stage based on comparison of the carrier waveform signal or value for the given inverter stage with the first and second reference signals or values; and shifting the amplitude level of at least two of the carrier waveform signals or values every integer number M waveform periods according to a repeating level shifting pattern, M being greater than zero.

19. The computer readable medium of claim 18, wherein M is greater than one.

20. The computer readable medium of claim 18, comprising computer executable instructions for shifting the amplitude level of the individual carrier waveform signals or values by at least two amplitude levels every M waveform periods according to the level shifting pattern.

* * * * *